US012434370B2

(12) United States Patent
Breitbach et al.

(10) Patent No.: US 12,434,370 B2
(45) Date of Patent: Oct. 7, 2025

(54) IMPACT TOOL ANVIL AND METHOD OF MANUFACTURE

(71) Applicant: MILWAUKEE ELECTRIC TOOL CORPORATION, Brookfield, WI (US)

(72) Inventors: Anthony E. Breitbach, Muskego, WI (US); Matthew W. Roeber, Milwaukee, WI (US); Eric A. Lembach, Wauwatosa, WI (US); Zachary J. Geschke, Milwaukee, WI (US); Jacob P. Schneider, Cedarburg, WI (US); Braden A. Roberts, Brookfield, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 18/635,271

(22) Filed: Apr. 15, 2024

(65) Prior Publication Data
US 2024/0342888 A1 Oct. 17, 2024

Related U.S. Application Data

(60) Provisional application No. 63/459,377, filed on Apr. 14, 2023.

(51) Int. Cl.
*B25D 17/06* (2006.01)
*B23K 26/352* (2014.01)
(Continued)

(52) U.S. Cl.
CPC ............ *B25D 17/06* (2013.01); *B23K 26/356* (2015.10); *B24C 1/10* (2013.01); *B25B 21/02* (2013.01);
(Continued)

(58) Field of Classification Search
CPC ........ B25D 17/06; B25D 11/00; B25D 11/04; B25B 21/02; B23K 26/352
See application file for complete search history.

(56) References Cited

U.S. PATENT DOCUMENTS 5,038,869 A * 8/1991 Olson ....................... F16D 1/06
81/177.85
5,311,764 A * 5/1994 Smith ...................... G01N 3/52
73/12.04
(Continued)

FOREIGN PATENT DOCUMENTS

DE 19508542 A1 9/1996
DE 102017101948 A1 8/2018
(Continued)

*Primary Examiner* — Gloria R Weeks
(74) *Attorney, Agent, or Firm* — Michael Best & Friedrich LLP

(57) ABSTRACT

An anvil for an impact tool including an impact receiving portion at an end of the anvil, the impact receiving portion including a lug having an impact receiving surface that receives impact from a hammer of the rotary power tool, a shank portion extending from the impact receiving portion, a drive portion located at an end of the shank portion opposite from the impact receiving portion, the drive portion including a plurality of drive surfaces configured to engage a tool bit, and a hardened layer formed on at least one of the drive portion or the impact receiving surface, the hardened layer having a higher hardness than a remaining portion of the anvil. The hardened layer is formed by a heating process.

20 Claims, 16 Drawing Sheets

(51) Int. Cl.
- *B23K 26/356* (2014.01)
- *B24C 1/10* (2006.01)
- *B25B 21/02* (2006.01)
- *B25B 23/00* (2006.01)

(52) U.S. Cl.
CPC .. *B25B 23/0035* (2013.01); *B25D 2217/0015* (2013.01)

(56) References Cited

U.S. PATENT DOCUMENTS

| | | | |
|---|---|---|---|
| 6,223,834 B1 | 5/2001 | Takamura et al. | |
| 6,702,037 B1 * | 3/2004 | Thiessen | E02D 7/10 |
| | | | 173/132 |
| 7,249,638 B2 | 7/2007 | Bodine et al. | |
| 7,926,586 B2 * | 4/2011 | Zhong | B25D 17/06 |
| | | | 173/171 |
| 8,418,587 B2 | 4/2013 | Debaker | |
| 8,490,714 B2 * | 7/2013 | Nakamura | B25B 21/00 |
| | | | 173/93.5 |
| 8,800,407 B2 | 8/2014 | Debaker | |
| 9,676,041 B2 | 6/2017 | Allen | |
| 10,022,724 B2 * | 7/2018 | Weeks | B02C 13/00 |
| 10,022,845 B2 | 7/2018 | Neitzell | |
| 10,201,893 B2 * | 2/2019 | Hauptmann | B25D 17/06 |
| 10,421,130 B2 | 9/2019 | Van Essen et al. | |
| 10,434,611 B2 | 10/2019 | Eggert | |
| 10,850,371 B2 | 12/2020 | Xu et al. | |
| 2006/0151188 A1 * | 7/2006 | Bodine | B25B 23/0035 |
| | | | 173/104 |
| 2012/0024117 A1 * | 2/2012 | Kreutzer | B25B 19/00 |
| | | | 81/463 |
| 2015/0158155 A1 * | 6/2015 | Tsubakimoto | B25B 21/02 |
| | | | 173/93 |
| 2021/0291329 A1 * | 9/2021 | Straub | B25B 21/02 |
| 2024/0189970 A1 | 6/2024 | Hirabayashi et al. | |

FOREIGN PATENT DOCUMENTS

| | | |
|---|---|---|
| DE | 102019200776 A1 | 7/2020 |
| EP | 0456003 A1 | 11/1991 |
| EP | 0925881 A1 | 6/1999 |
| EP | 2699391 A1 | 2/2014 |
| RU | 2148145 C1 | 4/2000 |
| WO | 2012049078 A1 | 4/2012 |
| WO | 2014015140 A1 | 1/2014 |
| WO | 2021197837 A1 | 10/2021 |
| WO | 2022094788 A1 | 5/2022 |

\* cited by examiner

IMPACT TOOL ANVIL AND METHOD OF MANUFACTURE

CROSS-REFERENCE TO RELATED APPLICATION

This application claims priority to U.S. Provisional Patent Application No. 63/459,377 filed on Apr. 14, 2023, the entire contents of which are incorporated herein by reference.

BACKGROUND

The present disclosure relates to power tool components, such as anvils for impact tools, and methods of manufacturing such components.

SUMMARY

In some aspects, the techniques described herein relate to an anvil for an impact tool, the anvil including: an impact receiving portion at an end of the anvil, the impact receiving portion including a lug having an impact receiving surface that receives impact from a hammer of the impact tool; a shank portion extending from the impact receiving portion; a drive portion located at an end of the shank portion opposite from the impact receiving portion, the drive portion including a plurality of drive surfaces configured to engage a tool bit; and a hardened layer formed on at least one of the drive portion or the impact receiving surface, the hardened layer having a higher hardness than a remaining portion of the anvil, wherein the hardened layer is formed by a heating process.

In some aspects, the techniques described herein relate to an anvil, wherein compressive residual stresses are added to the hardened layer by a peening process.

In some aspects, the techniques described herein relate to an anvil, wherein the peening process is a laser peening process.

In some aspects, the techniques described herein relate to an anvil, wherein the compressive residual stresses are added to the hardened layer at a location that is beneath a surface of the anvil.

In some aspects, the techniques described herein relate to an anvil, wherein the hardened layer is formed by the heating process over an entirety of the drive portion, and wherein the compressive residual stresses are added, via the peening process, at only a portion of the drive portion.

In some aspects, the techniques described herein relate to an anvil, wherein the compressive residual stresses are added to at least a quarter of an area of each of the drive surfaces.

In some aspects, the techniques described herein relate to an anvil, wherein the hardened layer is formed on both the drive portion and the impact receiving surface.

In some aspects, the techniques described herein relate to an anvil, wherein the hardened layer does not extend along the shank portion.

In some aspects, the techniques described herein relate to an anvil for an impact tool, the anvil including: an impact receiving portion at an end of the anvil, the impact receiving portion including a lug having an impact receiving surface that receives impact from a hammer of the impact tool; a shank portion extending from the impact receiving portion; and a drive portion located at an end of the shank portion opposite from the impact receiving portion, the drive portion including a plurality of drive surfaces configured to engage a tool bit, wherein at least one of the impact receiving portion or the drive portion includes a region having compressive residual stresses; and wherein the compressive residual stresses are imparted to the region by a laser peening process.

In some aspects, the techniques described herein relate to an anvil, wherein the region having compressive residual stresses is beneath a surface of the anvil.

In some aspects, the techniques described herein relate to an anvil, wherein the region is treated with a heating process to create a hardened layer in addition to the compressive residual stresses.

In some aspects, the techniques described herein relate to an anvil, wherein the drive portion includes the region, and wherein the hardened layer extends along an entire length of the drive portion.

In some aspects, the techniques described herein relate to an anvil, wherein the drive portion includes the region, and wherein the region includes corners of each of the plurality of drive surfaces that are positioned closest to the shank.

In some aspects, the techniques described herein relate to an anvil, wherein the region includes more than a quarter of an entire area of each of the plurality of drive surfaces.

In some aspects, the techniques described herein relate to an anvil, wherein the region includes the entire area of each of the plurality of drive surfaces.

In some aspects, the techniques described herein relate to an anvil, wherein the compressive residual stresses are imparted to the region by a shot peening process following the laser peening process.

In some aspects, the techniques described herein relate to an anvil for an impact tool, the anvil including: an impact receiving portion at an end of the anvil, the impact receiving portion including a lug having an impact receiving surface that receives impact from a hammer of the impact tool; a shank portion extending from the impact receiving portion; a drive portion located at an end of the shank portion opposite from the impact receiving portion, the drive portion including a plurality of drive surfaces configured to engage a tool bit; and a hardened layer formed on at least one of the drive portion or the impact receiving surface, the hardened layer having a higher hardness than a remaining portion of the anvil, wherein the hardened layer is formed by a diffusion process.

In some aspects, the techniques described herein relate to an anvil, wherein the remaining portion of the anvil is masked during the diffusion process.

In some aspects, the techniques described herein relate to an anvil, wherein the remaining portion of the anvil is ground after the diffusion process.

In some aspects, the techniques described herein relate to an anvil, wherein the diffusion process includes carburization.

In some aspects, the techniques described herein relate to an anvil, wherein the diffusion process includes nitriding.

In some aspects, the techniques described herein relate to an anvil, wherein compressive residual stresses are added to the hardened layer by a peening process.

In some aspects, the techniques described herein relate to an anvil, wherein the peening process is a laser peening process.

In some aspects, the techniques described herein relate to an anvil, wherein the peening process includes a laser peening process and a subsequent shot peening process.

In some aspects, the techniques described herein relate to generating a plasma wave within at least one of the impact receiving portion or the drive portion.

In some aspects, the techniques described herein relate to a hammer for an impact tool, the hammer including: a main body; a hammer lug including an impact surface configured to engage and apply impacts to a corresponding impact surface on an anvil of the impact tool; a transition surface between the main body and the hammer lug; and a hardened layer formed on at least one of the impact surface or the transition surface, the hardened layer having a higher hardness than a remaining portion of the hammer.

In some aspects, the techniques described herein relate to a hammer, further including a rim protruding from a forward surface of the main body and surrounding the hammer lug, wherein the hardened layer is formed on an inner surface of the rim.

In some aspects, the techniques described herein relate to a hammer, wherein compressive residual stresses are added to the hardened layer by a laser peening process. In some aspects, the techniques described herein relate to a hammer, wherein compressive residual stresses are added to the hardened layer by a shot peening process subsequent to the laser peening process.

In some aspects, the techniques described herein relate to a hammer, wherein the hardened layer is formed by an induction heating process.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
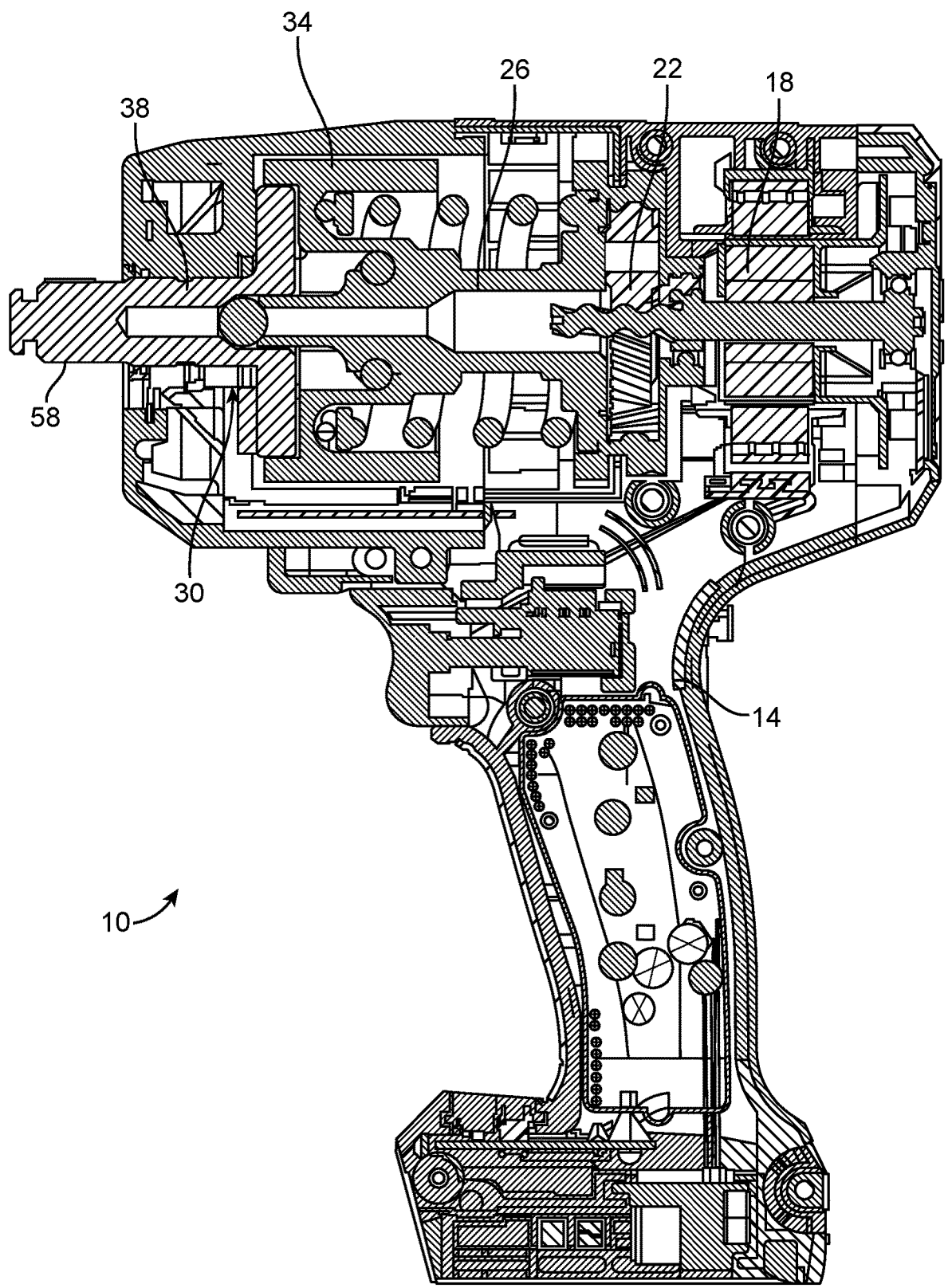
FIG. 1 is a cross-sectional view of a power tool including an impact mechanism having an anvil according to an embodiment of the disclosure.

FIG. 1 illustrates a power tool 10, and more specifically, a rotary impact tool such as an impact wrench. The power tool 10 includes, among other things, a housing 14, a motor 18, a gear assembly 22, a camshaft 26, and an impact mechanism 30. The motor 18 transmits torque to and drives rotation of the gear assembly 22 and the camshaft 26. The gear assembly 22 and the camshaft 26 transmit torque to and drive rotation of the impact mechanism 30. The impact mechanism 30 has a hammer 34 configured to strike an anvil 38 to impart torque on the anvil 38 and provide a torque output for the power tool 10. As such, operation of the power tool 10 may cause fatigue crack initiation, growth, and eventually, fracture, of the anvil 38 from repeated striking by the hammer 34.

Figure 2:
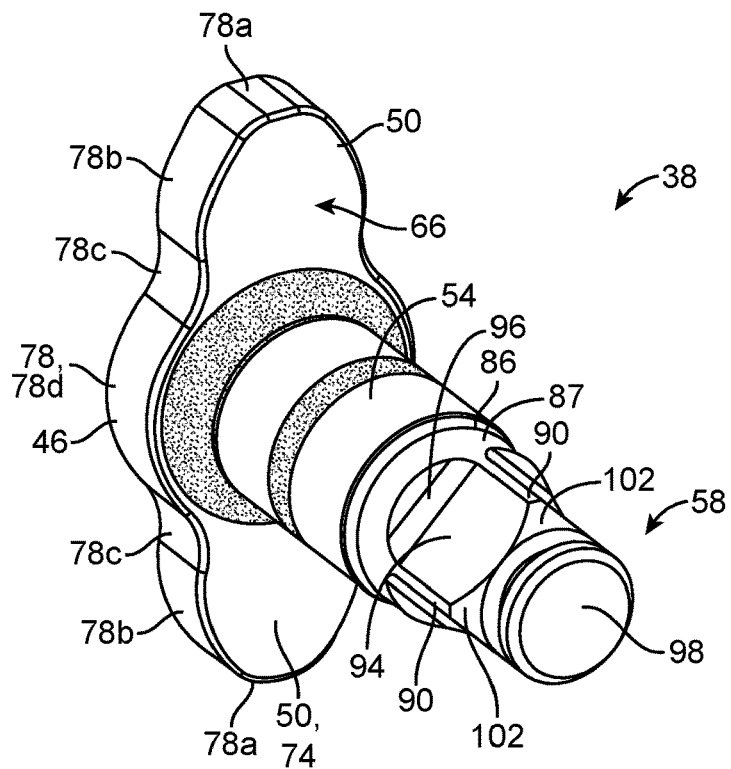
FIG. 2 is a front perspective view of the anvil of FIG. 1.
Figure 3:
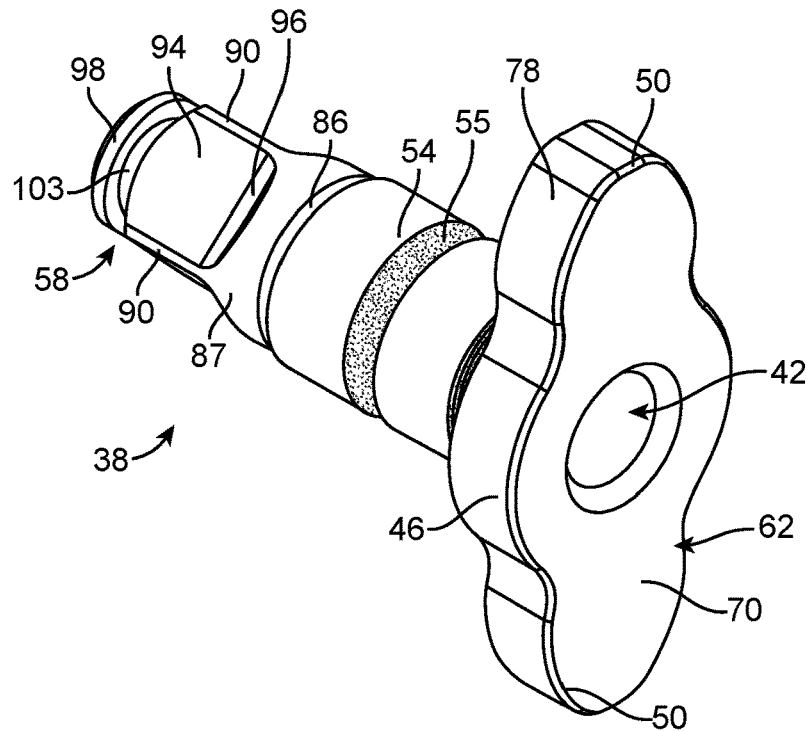
FIG. 3 is a rear perspective view of the anvil of FIG. 1.

FIGS. 2 and 3 illustrate the anvil 38 including an impact receiving portion 46, a drive portion 58 opposite the impact receiving portion 46, and a body or shank 54 extending between the impact receiving portion 46 and the drive portion 58. The illustrated impact receiving portion 46 includes a central bore or aperture 42 and a pair of lugs 50. The aperture 42 is formed on a rear side 62 of the impact receiving portion 46 and sized and positioned to receive and rotationally support a front end of the camshaft 26 (FIG. 1) when the power tool 10 is assembled. In other embodiments, the aperture 42 may be omitted, or the aperture 42 may be replaced by a projecting boss extending into a corresponding aperture in the front end of the camshaft 26.

The impact receiving portion 46 includes a rear face 70, a front face 74, and a peripheral face 78 extending between the rear face 70 and the front face 74. The aperture 42 is defined in the rear face 70, and the shank 54 extends from the front face 74. In the illustrated embodiment, the impact receiving portion 46 includes two lugs 50 that extend away from the aperture 42 and the shank 54 in a direction that is perpendicular to an extending direction of the shank 54. Stated another way, the lugs 50 are spaced diametrically across from each other relative to the aperture 42 such that the lugs 50 extend away from each other. The lugs 50 are configured to receive an impact (i.e., a torque transmission) from the hammer 34, and the anvil 38 transmits the impact (i.e., the torque) to the drive portion 58 through the shank 54.

With reference to FIG. 2, the peripheral face 78 of the impact receiving portion 46 includes tip portions 78a defined at a distal end of each lug 50, impact receiving surfaces 78b extending from the tip portions 78a, transition surfaces 78c extending from the impact receiving surfaces 78b, and a central portion 78d. The impact receiving surfaces 78b may have an involute profile in some embodiments and are configured to be directly struck by the hammer 34 during operation of the power tool 10. The central portion 78d has a constant radius in the illustrated embodiment, and the transition surfaces 78c provide a smooth transition between the impact receiving surfaces 78b and the central cylindrical portion 78d. In the illustrated embodiment, the concavity of the peripheral face 78 changes at the transition surfaces 78c.

Referring to FIGS. 2-3, the illustrated drive portion 58 includes a step 86, a body portion 87, a plurality of chamfers 90, a plurality of drive surfaces 94, a plurality of transition surfaces 96, and a flange 98. The step 86 extends from the shank 54 and converges radially inwardly to the body portion 87. The shank 54 and the body portion 87 may each have constant diameters in some embodiments, with the diameter of the body portion 87 being less than the diameter of the shank 54. In some embodiments, the shank 54 and/or the body portion 87 may include one or more grooves 55.

The drive surfaces 94 are formed as planar surfaces, which, in some embodiments, may be machined into the body portion 87. Each drive surface 94 is perpendicular to its adjacent drive surfaces 94, such that the drive surfaces 94 define a square-shaped drive configured to receive square-drive tool bits, such as sockets, or the like. As such, in the illustrated embodiment, the drive portion 58 includes four drive surfaces 94. The transition surfaces 96 are formed at the rear (proximal) end of the drive surfaces 94 and curve outwardly toward the body portion 87 to transition between the square cross-sectional shape defined by the drive surfaces 94 and the circular cross-sectional shape defined by the body portion 87. In other embodiments, the drive surfaces 94 may have other geometries to engage other types of tool bits.

With continued reference to FIGS. 2-3, the chamfers 90, which may be un-machined portions of the body portion 87, extend between and interconnect adjacent drive surfaces 94. In the illustrated embodiment, rounded end surfaces 102 are formed at forward (distal) end of the chamfers 90 and drive surfaces 94. A groove 103 is defined between the rounded end surfaces 102 and the flange 98. The groove 103 is configured to receive a ring (e.g., a rubber o-ring; not shown). The ring may engage the interior of a connected tool bit to provide increased friction, thereby retaining the tool bit on the drive portion 58. In other embodiments, one or more of the drive surfaces 94 may include a bore configured to receive a detent (e.g., a ball detent) to retain the tool bit on the drive portion 58. In such embodiments, the flange 98 and groove 103 may be omitted.

The anvil 38 is subjected to repeated, localized, high-magnitude forces during operation of the power tool 10. Some portions of the anvil 38, such as the impact receiving surfaces 78b and the drive portion 58, may benefit from high hardness to provide increased strength and wear-resistance, as well as high residual compressive stress to increase resistance to fatigue crack initiation. Other portions of the anvil 38 may benefit from lower hardness to provide increased toughness. Accordingly, a need exists for an anvil 38 with different material properties in different areas of the anvil 38.

Figure 4:
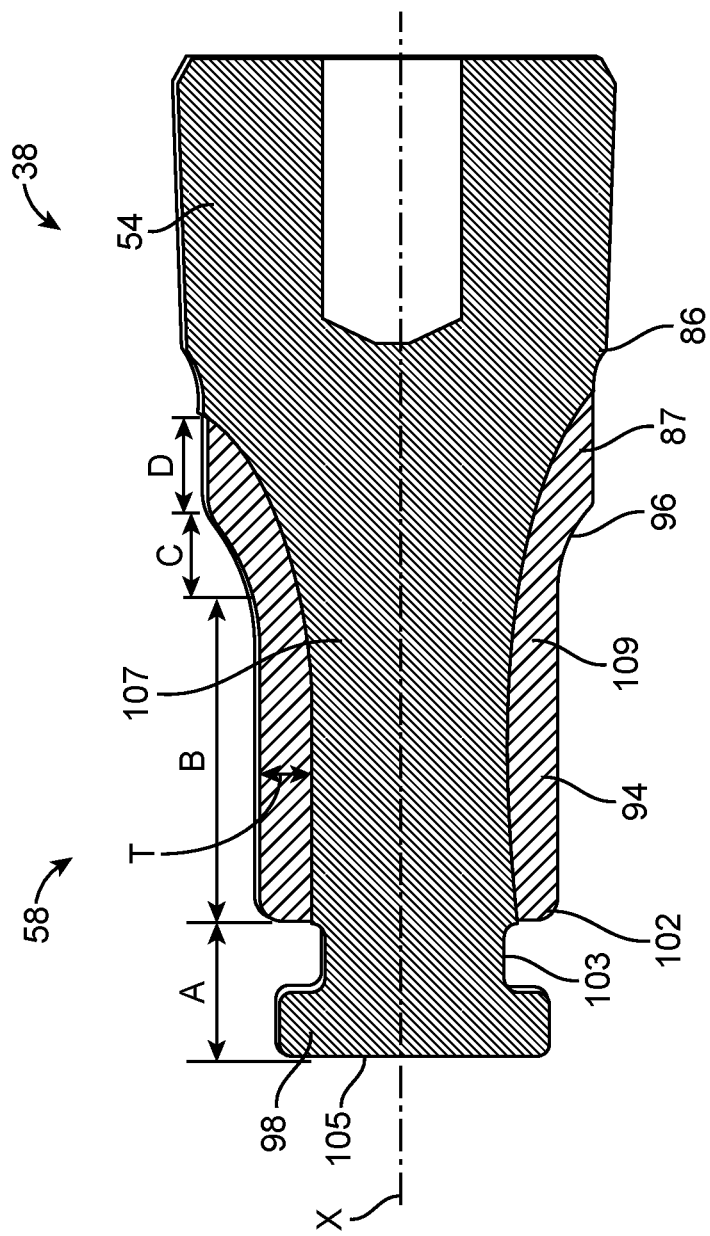
FIG. 4 is a cross-sectional view of the anvil of FIG. 1.

FIG. 4 illustrates a cross-section of the anvil 38. The anvil 38 has a first region A with a length along a rotational axis X of the anvil 38, from a front end 105 of the anvil 38 to the end surfaces 102. The anvil 38 has a second region B with a length along the rotational axis X of the anvil 38, from the end surfaces 102 to the transition surfaces 96. The second region B therefore contains the drive surfaces 94. The anvil 38 further has a third region C with a length along the rotational axis X of the anvil 38 spanning the transition surfaces 96. Finally, the anvil 38 has a fourth region D with a length along the rotational axis X of the anvil 38 from the rear ends of the transition surfaces 96 toward the step 86. In some embodiments, the fourth region D may span the entire length between the transition surfaces 96 and the step 86. In other embodiments, the length of the fourth region D may be less than the length between the transition surfaces 96 and the step 86. In the illustrated embodiment, the length of the second region B is greater than the length of the first region A, which is greater than the length of the fourth region D, which is greater than the length of the third region C.

With continued reference to FIG. 4, the illustrated anvil 38 has a core 107 and a hardened layer 109 surrounding the core 107. In the illustrated embodiment, the hardened layer 109 has a thickness T and extends the lengths of each of the second, third, and fourth regions B, C, D. The thickness T may be substantially uniform in each of the regions B, C, D. Alternatively, the thickness T may vary (e.g., the thickness T may be greater in region B than in regions C and D, etc.). In some embodiments, the thickness T may be between 0.7 mm and 2.0 mm in each of the regions B, C, D. In some embodiments, the thickness T may be between 1.0 mm and 1.5 mm in each of the regions B, C, D.

The anvil 38 may be integrally formed as a monolithic body from a single type of material. For example, in some embodiments, the anvil 38 may be formed via a forging process. In other embodiments, the anvil 38 may be formed via a casting or a powdered metal (PM) manufacturing process. The anvil 38 may be made of a hardenable steel. For example, the anvil 38 may be made of medium carbon steel in some embodiments. In other embodiments, the anvil 38 may be made from a tool steel, such as S7, H13, YXR33, CMP3V, A9, or the like. The core 107 has a lower hardness than the hardened layer 109. For example, in some embodiments, the core 107 may have a hardness from 35 to 54 HRC, and the hardened layer 109 may have a hardness from 55 to 62 HRC. This provides the core 107 with high toughness to reduce the likelihood of fracturing. The hardened layer 109 provides high strength and wear resistance on portions of the anvil 38 that may contact the tool bit. In some embodiments, the lugs 50 may also include a hardened layer, which may have the same or similar properties as the hardened layer 109. The hardened layer on the lugs 50 provides high strength and wear resistance on portions of the anvil 38 that contact the hammer 34.

Figure 5A:
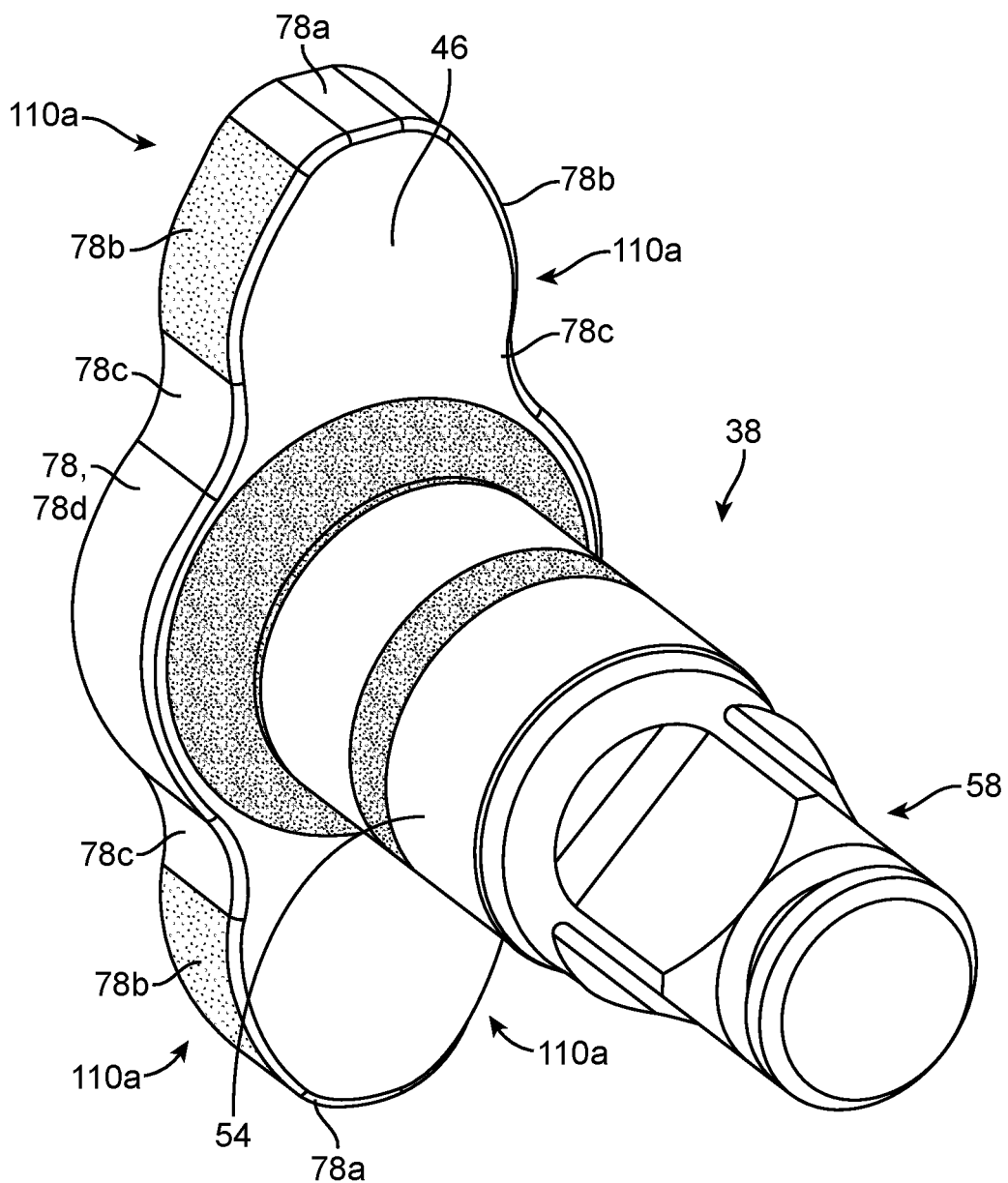
FIG. 5A is a front perspective view of the anvil of FIG. 1, illustrating a first processed region.

FIG. 5A illustrates a first area 110a of the anvil 38 that may be locally hardened via the processes described herein (e.g., to form the hardened layer 109 in the first area 110a). In the illustrated embodiment, the first area 110a includes only the impact receiving surfaces 78b of the peripheral face 78 of each lug 50. That is, the first area 110a does not include the tip portions 78a, transition surfaces 78c, or central portion 78d in some embodiments. Since only the impact receiving surfaces 78b are contacted by the hammer 34, the remaining portions of the lugs 50 can have a lower hardness in order to provide the lugs 50 with increased toughness. In other embodiments, the first area 110a may extend into the tip portions 78a and/or transition surfaces 78c.

Figure 5B:
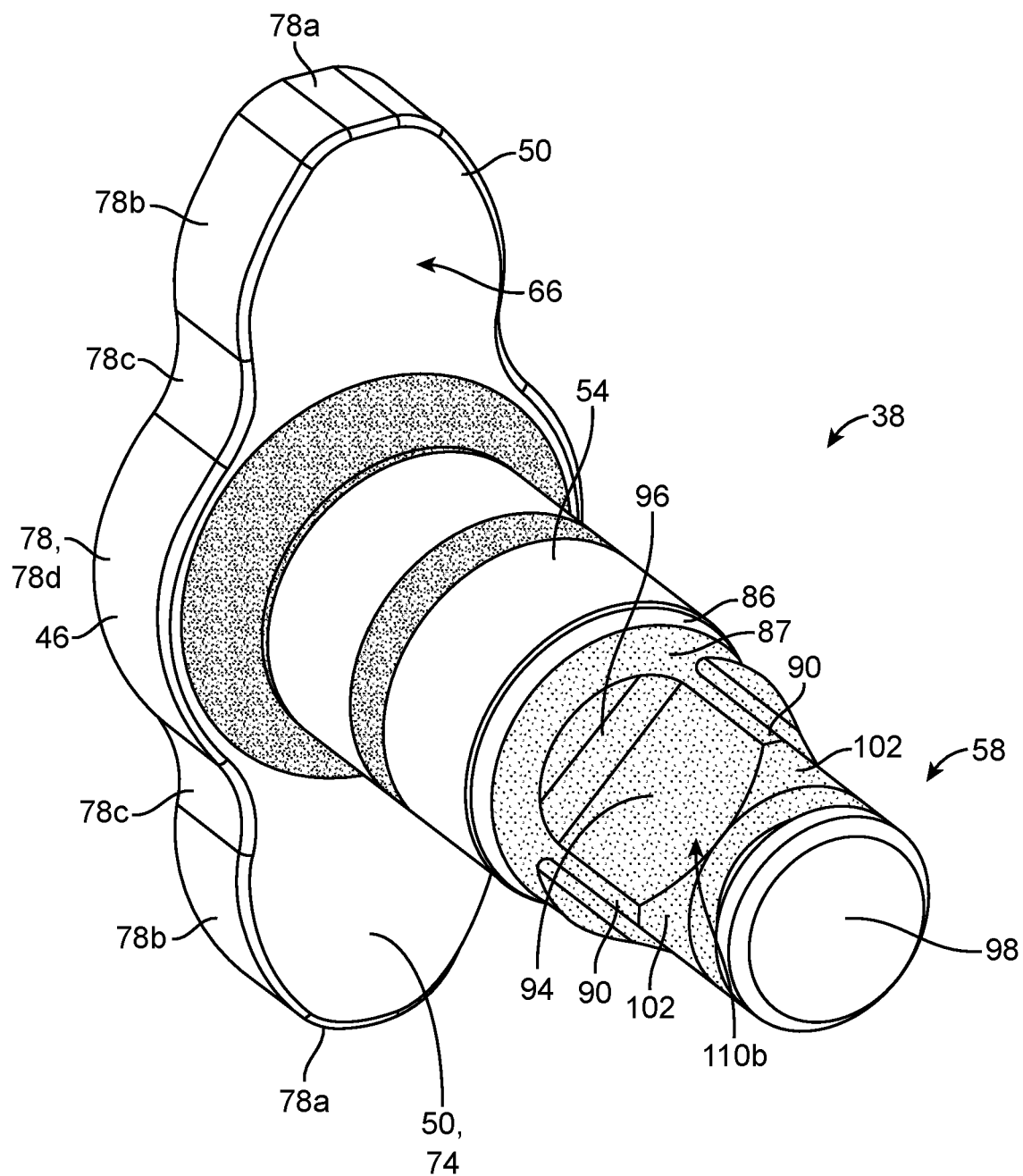
FIG. 5B is a front perspective view of the anvil of FIG. 1, illustrating a second processed region.

FIG. 5B illustrates a second area 110b of the anvil 38 that may be locally hardened via the processes described herein (e.g., to form the hardened layer 109 in the second area 110b). In the illustrated embodiment, the second area 110b includes the body portion 87, chamfers 90, drive surfaces 94, transition surfaces 96, and end surfaces 102. The second area 110b does not include the flange 98, the step 86, or the shank 54 in the illustrated embodiment. The second area 110b corresponds with surfaces of the drive portion 58 that may engage with the tool bit or another type of workpiece when the tool bit or the workpiece is coupled to the anvil 38. The drive surfaces 94 may experience high compressive and tensile stresses, and the transition surfaces 96 may experience high stress concentrations due to their geometries and to axial percussive loading that may occur if an end of the tool bit presses against the transition surfaces 96. Hardening of the body portion 87 and end surfaces 102 may promote more even hardening of the drive surfaces 94 and transition surfaces 96 so that the thickness T of the hardened layer 109 is generally uniform (FIG. 4). The flange 98, is not subject to surface hardening in the illustrated embodiment such that the flange 98 remains part of the softer core 107. Because the flange 98 is relatively thin and defines the front end 105 of the anvil 38, the flange 98 would be more susceptible to breakage if it had the high hardness of the hardened layer 109 and the power tool 10 was dropped. An anvil 38 that has been locally hardened at the second area 110b has roughly a 30% decrease in maximum stress during the working operation.

Figure 5C:
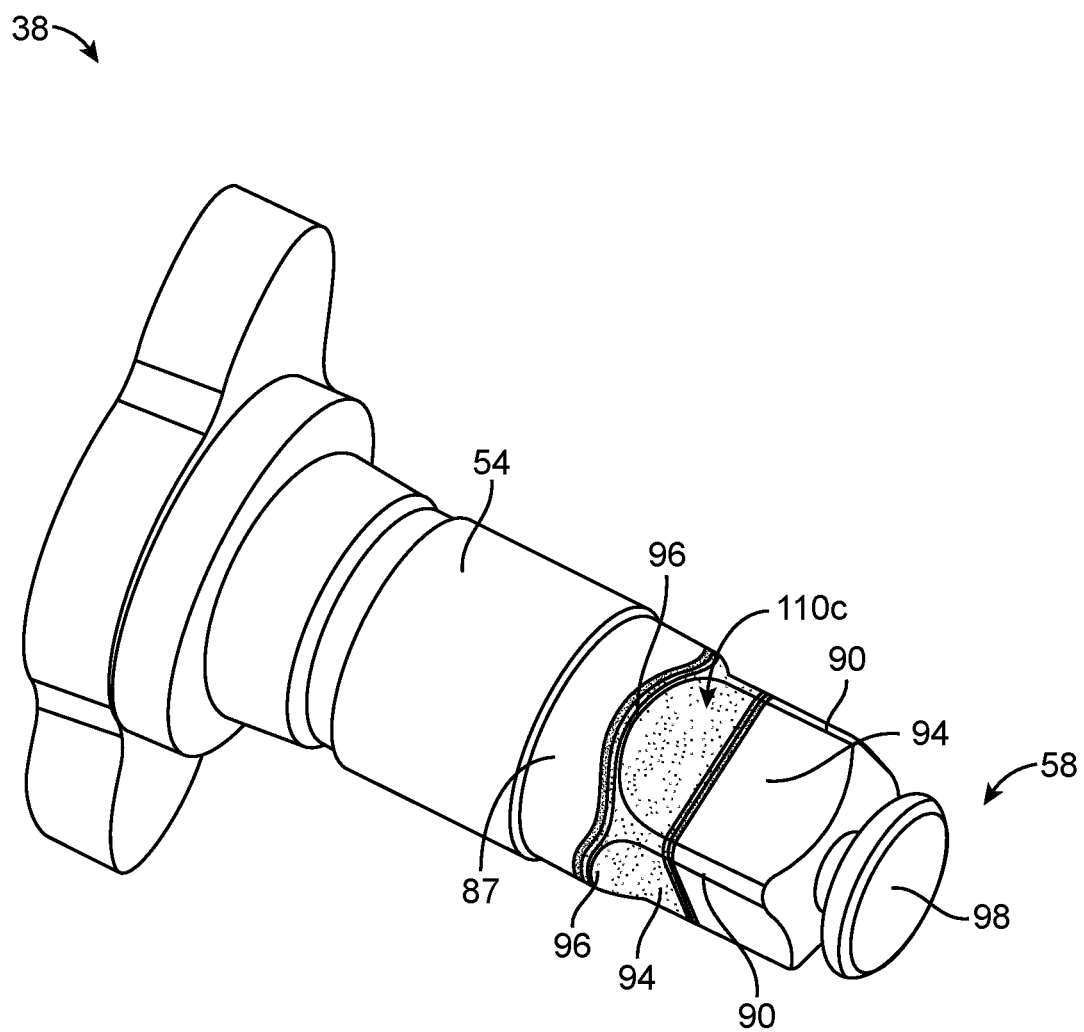
FIG. 5C is a front perspective view of the anvil of FIG. 1, illustrating a third processed region.

FIG. 5C illustrates a third area 110c of the anvil 38 that may be locally hardened via the processes described herein (e.g., to form the hardened layer 109 in the third area 110c). The third area 110c includes a portion of each of the chamfers 90, a portion of each of the drive surfaces 94, and the transition surfaces 96. In the illustrated embodiment, the portion of each of the chamfers 90 included in the third area 110c is greater than a quarter but less than half of the total area of the chamfers 90. Additionally, the portion of each of the drive surfaces 94 included in the third area 110c is at least a quarter of but less than half of the total area of the drive surfaces 94. The third area 110c does not include the body portion 87, the flange 98, the step 86, or the shank 54. An anvil 38 that has been locally hardened at the third area 110c has roughly a 16.5% decrease in maximum stress during the working operation.

Figure 5D:
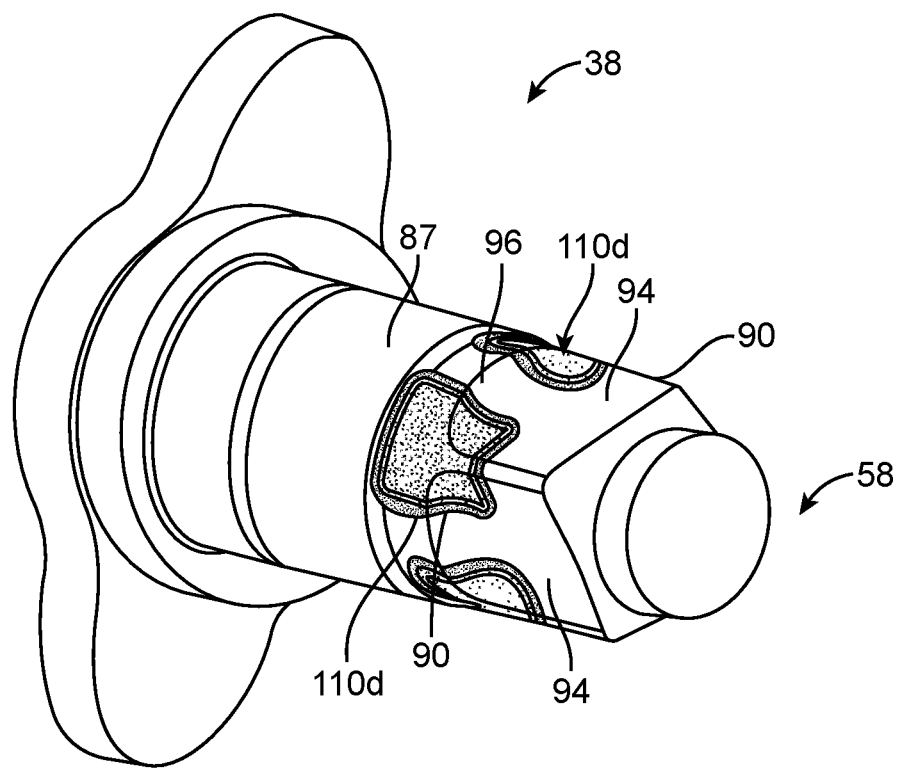
FIG. 5D is a front perspective view of the anvil of FIG. 1, illustrating a fourth processed region.

FIG. 5D illustrates a fourth area 110d of the anvil 38 that may be locally hardened via the processes described herein (e.g., to form the hardened layer 109 in the fourth area 110d). In the illustrated embodiment, the fourth area 110d includes regions where the body portion 87, the chamfers 90, the drive surfaces 94, and the transition surfaces 96 meet. In other words, the fourth area 110d includes the corners of each of the square-shaped drive surfaces 94, and a portion of each of the body portion 87, the chamfers 90, and the transition surfaces 96 that is adjacent to the corners of the drive surfaces 94. An anvil 38 that has been locally hardened at the fourth area 110d has roughly a 12.2% decrease in maximum stress during the working operation.

Figure 6A:
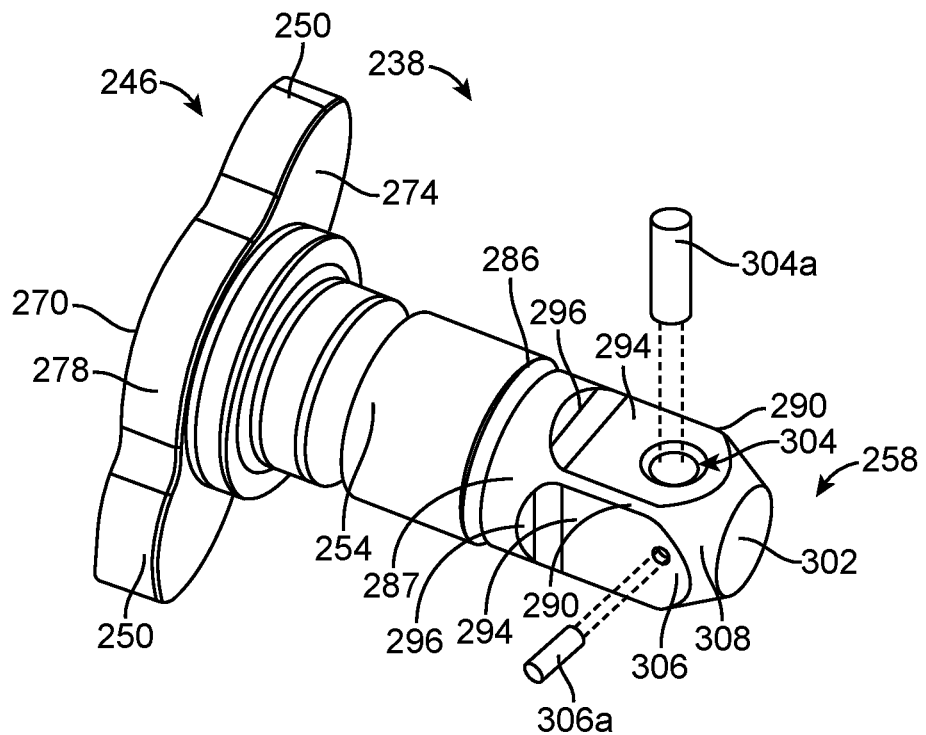
FIG. 6A is a front perspective view of an anvil according to another embodiment of the disclosure.
Figure 6B:
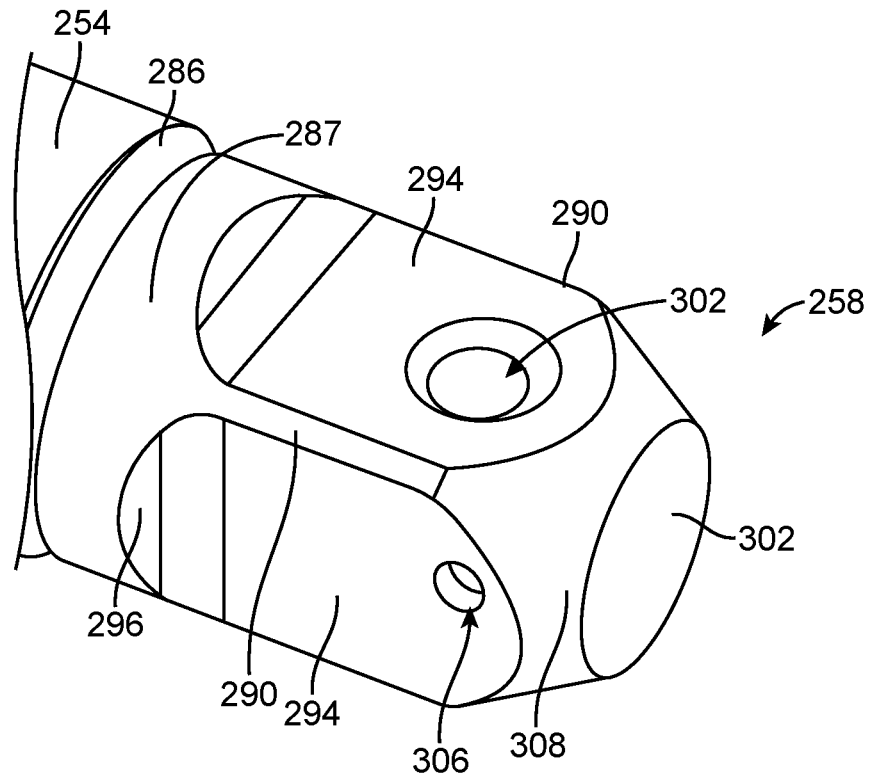
FIG. 6B is an enlarged view of a portion of the anvil of FIG. 6A.

FIGS. 6A and 6B illustrate an anvil 238 according to another embodiment of the disclosure. The anvil 238 may be substantially similar to the anvil 38 of FIGS. 2 and 3, except for the differences described herein. As illustrated in FIGS. 6A and 6B, the anvil 238 includes an impact receiving portion 246, a drive portion 258 opposite the impact receiving portion 246, and a body or shank 254 extending between the impact receiving portion 246 and the drive portion 258. In the illustrated embodiment, the anvil 238 is formed as a pin-detent anvil; however, the anvil 238 may alternatively be formed as a ball-detent anvil or an anvil with another type of bit retention interface.

The impact receiving portion 246 includes a rear face 270, a front face 274, and a peripheral face 278 extending between the rear face 270 and the front face 274. A central bore or aperture, similar to the aperture 42 of FIG. 3, may be defined in the rear face 270 to facilitate coupling with a camshaft. The impact receiving portion 246 includes two lugs 250 that extend away from the shank 254 in a direction that is perpendicular to an extending direction of the shank 254. The lugs 250 are configured to receive an impact (i.e., a torque transmission) from the hammer, and the anvil 238 transmits the impact (i.e., the torque) to the drive portion 258 through the shank 254. In some embodiments, the lugs 250 may have an involute profile.

The illustrated drive portion 258 includes a step 286, a body portion 287, a plurality of chamfers 290, a plurality of drive surfaces 294, a plurality of transition surfaces 296, and an end surface 302. The step 286 extends from the shank 254 and converges radially inwardly to the body portion 287. The shank 254 and the body portion 287 may have constant diameters in some embodiments, with the diameter of the body portion 287 being less than the diameter of the shank 254. In some embodiments, the shank 54 and/or the body portion 287 may include one or more grooves.

The drive surfaces 294 are formed as planar surfaces, which in some embodiments, may be machined into the body portion 287. Each drive surface 294 is perpendicular to its adjacent drive surfaces 294 such that the drive surfaces 294 define a square-shaped drive configured to receive square-drive tool bits, such as sockets, or the like. As such, in the illustrated embodiment, the drive portion 258 includes four drive surfaces 294. A detent receptacle 304 is formed, or defined, in one of the drive surfaces 294, and a pin receptacle 306 is formed, or defined, in a drive surface 294 adjacent to the drive surface 294 including the detent receptacle 304. The detent receptacle 304 is configured to receive a detent 304a to facilitate coupling with a tool bit or another type of workpiece. The pin receptacle 306 is configured to receive a pin 306a that secures the detent 304a relative to the anvil 238. As such, the detent receptacle 304 and the pin receptacle 306 are in fluid communication. The transition surfaces 296 are formed at the rear (proximal) end of the drive surfaces 294 and curve outwardly toward the body portion 287 to transition between the square cross-sectional shape defined by the drive surfaces 294 and the circular cross-sectional shape defined by the body portion 287. In other embodiments, the drive surfaces 294 may have other geometries to engage other types of tool bits.

With continued reference to FIGS. 6A and 6B, the chamfers 290, which may be un-machined portions of the body portion 287, extend between and interconnect adjacent drive surfaces 294. In the illustrated embodiment, the chamfers 290 extend to the end surface 302. The end surface 302 is oriented perpendicular to the extending direction of the shank 254. As such, a transition collar 308 connects the chamfers 290 and the end surface 302. Specifically, the transition collar 308 curves from the chamfers 290 to the end surface 302.

The anvil 238 is subjected to repeated, localized, high-magnitude forces during operation of the power tool. Some portions of the anvil 238, such as the drive portion 258, may benefit from high hardness to provide increased strength and wear-resistance, as well as high residual compressive stress to increase resistance to fatigue crack initiation. Specifically, the areas surrounding the detent receptacle 304 and the pin receptacle 306 may experience variable high stress due to movement of the detent 304a and the pin 306a within the detent receptacle 304 and the pin receptacle 306, respectively.

Figure 7A:
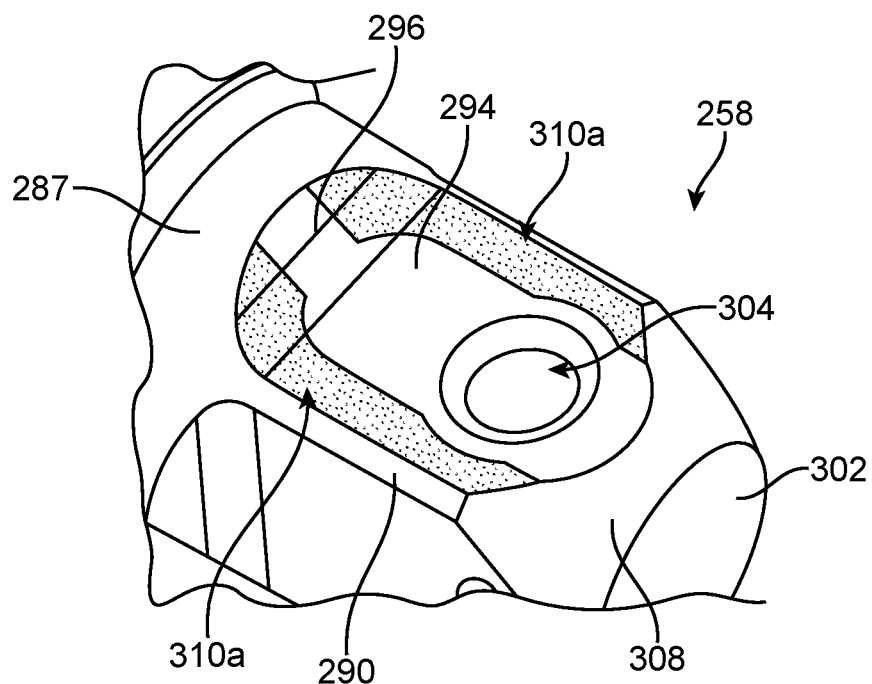
FIG. 7A is a top view of the enlarged view of the portion of the anvil of FIG. 6B, illustrating a first processed region.

FIG. 7A illustrates a first area 310a of the anvil that may be locally hardened via the processes described herein (e.g., to form a hardened layer in the first area 310a). In the illustrated embodiment, the first area 310a includes the drive surface 294 that forms, or defines, the detent receptacle 304 and the transition surface 296 adjacent to the drive surface 294 that forms the detent receptacle 304. Specifically, the first area 310*a* includes a strip along each of the edges of the drive surface 294 that extends parallel to the extending direction of the shank 254. The strips extend from the transition surface 296 adjacent to the drive surface 294 that forms the detent receptacle 304 to an area of the drive surface 294 adjacent to the transition collar 308.

Figure 7B:
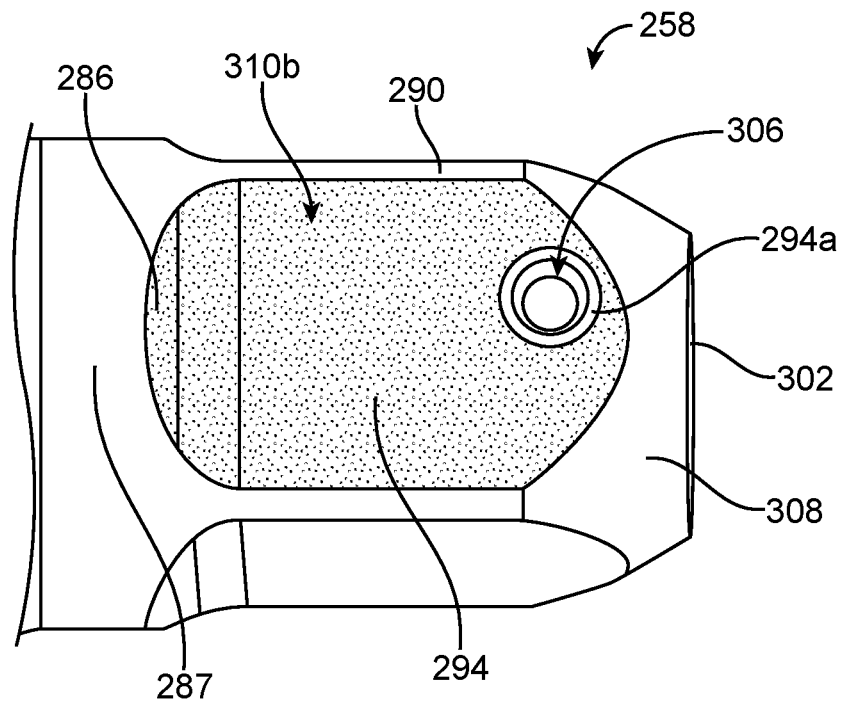
FIG. 7B is side view of the enlarged view of the portion of the anvil of FIG. 6B, illustrating a second processed region.

FIG. 7B illustrates a second area 310*b* of the anvil 238 that may be locally hardened via the processes described herein (e.g., to form a hardened layer in the second area 310*b*). In the illustrated embodiment, the second area 310*b* includes the drive surface 294 that forms, or defines, the pin receptacle 306, and the transition surface 296 that is adjacent to the drive surface 294 that defines the pin receptacle 306. Specifically, the second area 310*b* includes the entire transition surface 296 that is adjacent to the drive surface 294 that forms the pin receptacle 306 and the entire drive surface 294 that forms the pin receptacle 306 with the exception of an area 294*a* of the drive surface 294 directly surrounding the pin receptacle 306. The area 294*a* of the drive surface 294 directly surrounding the pin receptacle 306 may be curved, or chamfered, and therefore, may not be suitable to be locally hardened. Although the first area 310*a* and the second area 310*b* of the anvil 238 are described separately, it is understood that the anvil 238 may be locally hardened, via the processes described herein, at both the first area 310*a* and the second area 310*b*. For example, the entire drive portion 258 may be locally hardened.

Figure 8:
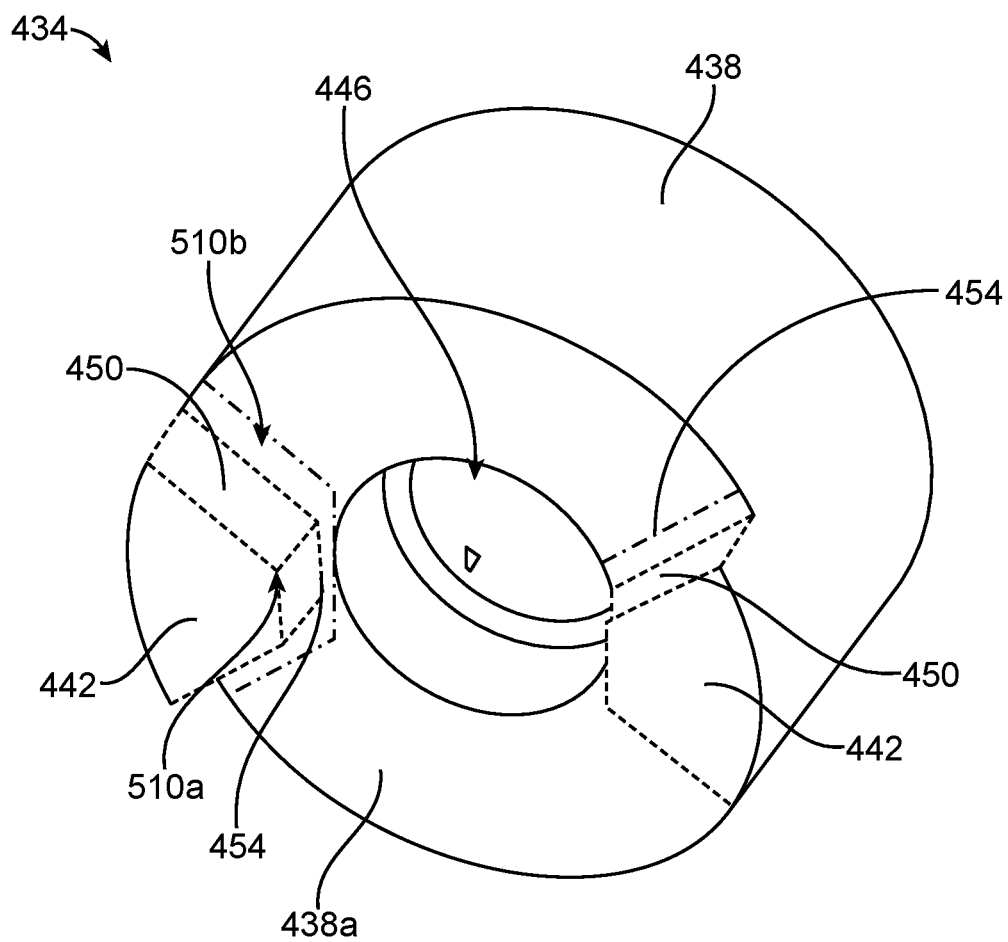
FIG. 8 is a perspective view of a hammer, according to one embodiment of the disclosure, configured for use with the power tool of FIG. 1.

FIG. 8 illustrates a hammer 434 according to one embodiment of the disclosure. The hammer 434 includes a main body 438 and hammer lugs 442 that protrude from a forward surface 438*a* of the main body 438. The main body 438 defines a mounting aperture 446 that is configured to receive a camshaft for slidably mounting the hammer 434 onto the camshaft. The hammer lugs 442 include impact surfaces 450 that are configured to engage and apply impacts to corresponding impact surfaces on an anvil. A transition surface 454 is provided between the forward surface 438*a* of the main body 438 and each of the hammer lugs 442. Specifically, the transition surface 454 is provided between the forward surface 438*a* and each of the impact surfaces 450 on each of the hammer lugs 442. In some embodiments, the transition surface 454 may be formed a groove that undercuts the lugs 442 and the forward surface 438*a* of the main body 438.

With continued reference to FIG. 8, a first area 510*a* of the hammer 434 may be locally hardened via the processes described herein (e.g., to form a hardened layer in the first area 510*a*). In the illustrated embodiment, the first area 510*a* includes the impact surfaces 450 of each of the hammer lugs 442. A second area 510*b* of the hammer 434 may additionally or independently be locally hardened via the processes descried herein (e.g., to form a hardened layer in the second area 510*b*). The second area 510*b* includes the transition surfaces 454 that are positioned between the forward surface 438*a* of the main body 438 and the hammer lugs 442. The impact surfaces 450 of the hammer lugs 442 may experience high compressive and tensile stresses, and the transition surfaces may experience high stress concentrations due to their geometries. As such, the first area 510*a* and the second area 510*b* may be individually hardened or hardened in combination via the processes described herein to counteract the respective stresses.

Figure 9A:
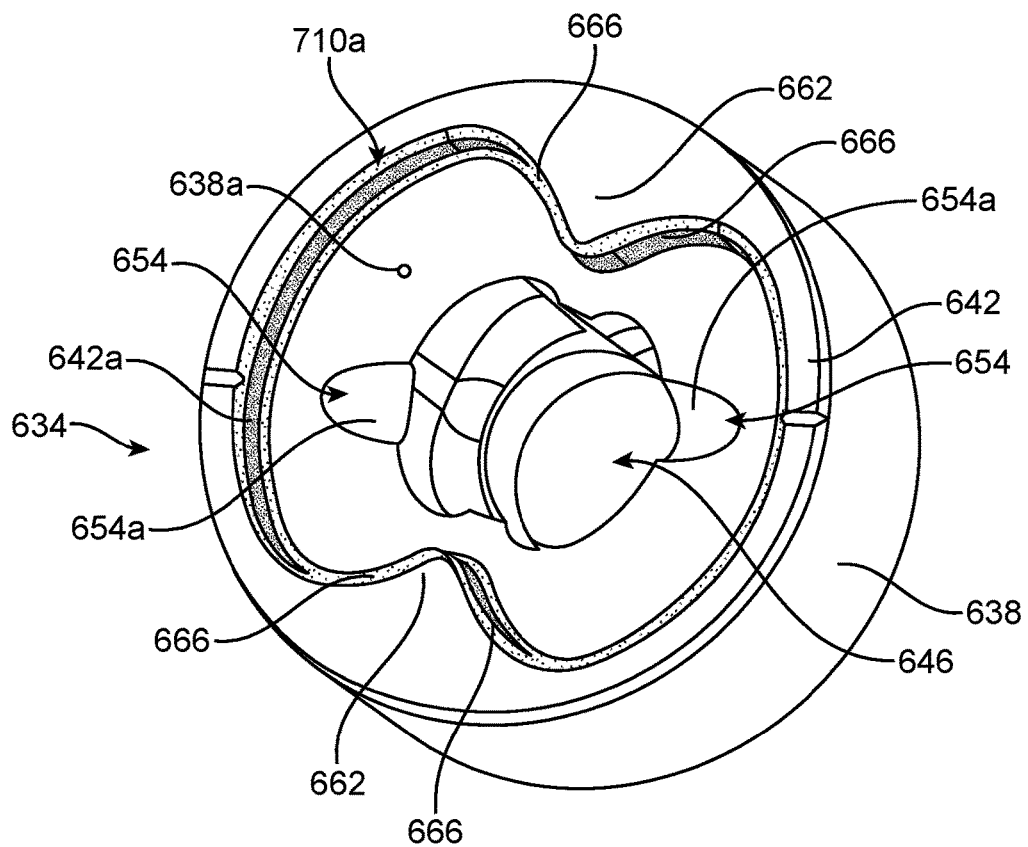
FIG. 9A is a perspective view of a hammer, according to another embodiment of the disclosure, configured for use with the power tool of FIG. 1.
Figure 9B:
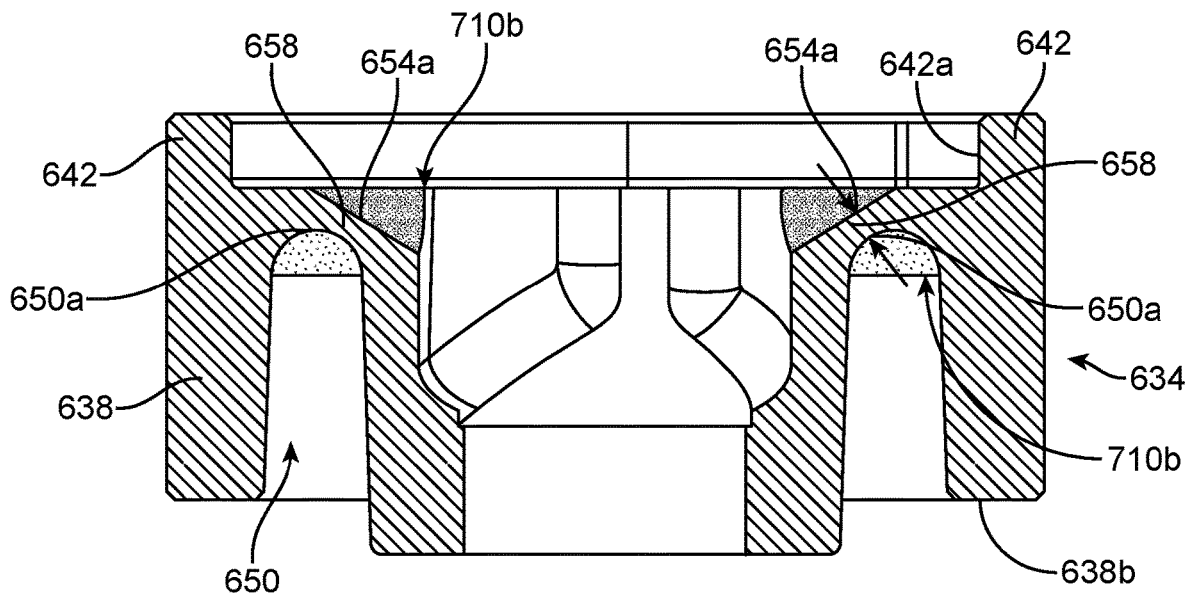
FIG. 9B is a cross-sectional view of the hammer of FIG. 9A taken along a center of the hammer.

FIGS. 9A and 9B illustrates a hammer 634 according to another embodiment of the disclosure. The hammer 634 includes a main body 638 and a rim 642 protruding from a forward surface 638*a* of the main body 638 and positioned around a perimeter of the main body 638. The main body 638 defines a mounting aperture 646 that is configured to receive a camshaft for slidably mounting the hammer 634 onto the camshaft. The main body 638 additionally defines a spring receptacle 650 on a rearward surface 638*b* of the main body 638 and divots or grooves 654 in the forward surface 638*a* of the main body 638. The spring receptacle 650 is configured to receive a hammer spring. The grooves 654 slope from the forward surface 638*a* of the main body 638 into the aperture 646. An end surface 650*a* of the spring receptacle 650 and sloped surfaces 654*a* of the grooves 654 are provided adjacent to each other such that a relatively narrow portion 658 of main body 638 extends between the spring receptacle 650 and the grooves 654. The rim 642 includes hammer lugs 662 that protrude inwardly from the outer perimeter of the main body 638. The hammer lugs 662 include impact surfaces 666 that are configured to engage and apply impacts to corresponding impact surfaces on an anvil. In the illustrated embodiment, the impact surfaces 666 on the hammer lugs 662 are formed such that each of the hammer lugs 662 has an involute profile.

FIG. 9A illustrates a first area 710*a* of the hammer 634 that may be locally hardened via the processes described herein (e.g., to form a hardened layer in the first area 710*a*). In the illustrated embodiment, the first area 710*a* includes an inner surface 642*a* of the rim 642. As such, the first area 710*a* includes the impact surfaces 666 of each of the hammer lugs 662 and the portions of the inner surface 642*a* of the rim 642 that connect the hammer lugs 662 together. The impact surfaces 666 of the hammer lugs 662 may experience high compressive and tensile stresses, and the portions of the inner surface 642*a* of the rim 642 that connect the hammer lugs 662 may experience radial forces generated by the involute hammer lugs 662. As such, the impact surfaces 666 and the portions of the inner surface 642*a* of the rim 642 that connect the hammer lugs 662 may be hardened via the processes described herein to counteract the respective stresses and forces.

FIG. 9B illustrates a second area 710*b* of the hammer 634 that may be locally hardened via the processes described herein (e.g., to form a hardened layer in the second area 710*b*). In the illustrated embodiment, the second area 710*b* includes the end surface 650*a* of the spring receptacle 650 and the sloped surfaces 654*a* of the grooves 654. In other words, the second area 710*b* includes the outer surfaces of the relatively narrow portion 658 of the main body 638. In some instances, increasing the case depth of the hammer 634 (i.e., the distance between a forward end of the rim 642 and the forward surface of the main body 638) may be beneficial to the operation of the hammer 634. Increasing the case depth may reduce the size of the relatively narrow portion 658 of the main body 638 between the spring receptacle 650 and the grooves 654, thereby increasing the risk of fracture for the relatively narrow portion 658. As such, the second area 710*b* of the hammer 634 may be advantageously hardened to reduce fractures along the end surface 650*a* of the spring receptacle 650 and along the sloped surfaces 654*a* of the grooves 654.

The following is a description of the treatment processes to form a hardened layer in the anvils 38, 238 and/or the hammers 434, 634 described herein. For the sake of brevity, the processes are described with respect to the anvil 38 of FIGS. 1-3. However, it is understood that the processes may equally apply to the anvil 238 of FIG. 6A, the hammer 434 of FIG. 8, and/or the hammer 634 of FIG. 9A. During manufacturing, the anvil 38 undergoes one or more treatment processes to form the hardened layer 109 in the first area 110*a* and/or the second area 110*b*. These treatment processes may be localized so as to only target and harden desired portions of the anvil 38, while leaving other portions of the anvil 38 with a lower hardness for improved toughness.

In one embodiment, the anvil 38 is carburized to form the hardened layer 109. During carburization, the anvil 38 is heated in a high carbon atmosphere. The exposed surfaces of the anvil 38 absorb carbon from the high carbon atmosphere, which increases the carbon content—and therefore the hardness—of the steel in the anvil 38 to form the hardened layer 109 (upon quenching of the anvil 38). A protective mask material, which may include a paint or tape in some embodiments, may be applied to portions of the anvil 38 prior to carburization to prevent formation of the hardened layer 109 in those portions. For example, the protective mask material may be applied to the anvil except for the first area 110a and the second area 110b. Thus, only the first area 110a and the second area 110b absorb carbon during the carburization process. In other embodiments, the anvil 38 may additionally or alternatively undergo a nitriding process or other diffusive hardening process to form the hardened layer 109. In such embodiments, a similar protective mask material may be applied to shield the portions of the anvil 38 apart from the first area 110a and the second area 110b. In other embodiments, portions of the anvil 38 may be ground after a diffusive hardening process to selectively remove the hardened layer from areas where lower surface hardness is desired.

In other embodiments, the anvil 38 is locally hardened via a heating process to form the hardened layer 109. For example, in some embodiments, the first area 110a and the second area 110b of the anvil 38 are locally heated via induction. After being heated by induction, the first area 110a and the second area 110b may be quenched to maintain a higher percentage of martensite, thereby providing a higher hardness. In other embodiments, the first area 110a and the second area 110b of the anvil 38 are locally heated via one or more lasers. Lasers are able to provide more precise targeting of the complex geometries of the first area 110a and the second area 110b of the anvil 38 compared to induction heating. In addition, laser hardening may eliminate the need for a separate quenching step, as the locally heated area is small compared to the remaining volume of the anvil 38. The anvil 38 thus acts as a heat sink to quickly dissipate the heat imparted by the laser, providing a self-quenching function that preserves a higher percentage of martensite.

In some embodiments, the anvil 38 may undergo additionally or alternatively undergo one or more surface processing steps in place of or in addition to the local hardening step. In some embodiments, the surface processing step may include a peening process, such as a shot-peening process, which may produce compressive residual stresses on the outer surfaces of the anvil 38. In some embodiments, the anvil 38 is blasted via a targeted laser peening process in specific locations (e.g., the areas 110a, 110b). In some embodiments, the anvil 38 is subjected to both a laser peening process and subsequently to a shot peening process.

With reference to FIGS. 6A-6D, the laser peening process produces compressive residual stress within specific target regions on the anvil 38 to modify mechanical properties of the metal, such as increased fatigue resistance, at the target areas 110a, 110b on the anvil 38.

Figure 10A:
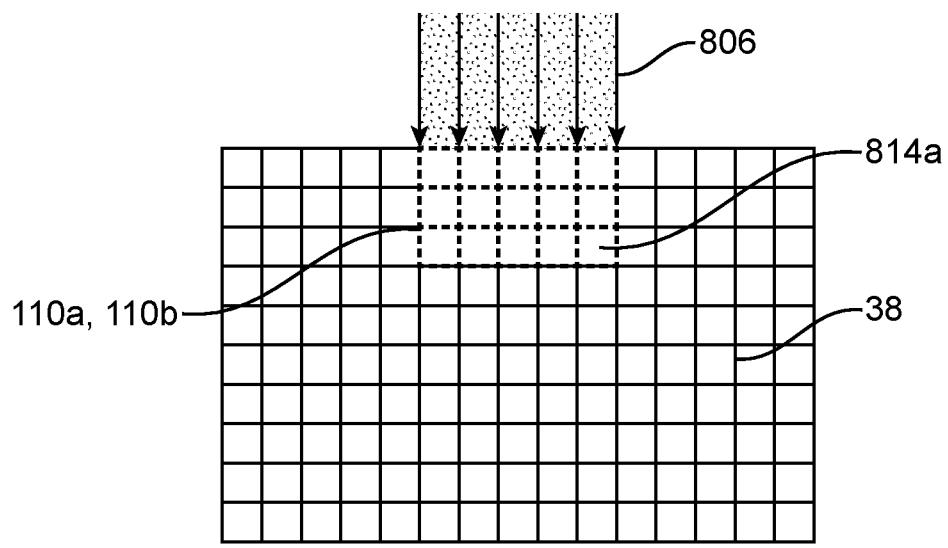
FIG. 10A is a schematic view of a first step of a laser peening process for the anvil of FIG. 1.
Figure 10B:
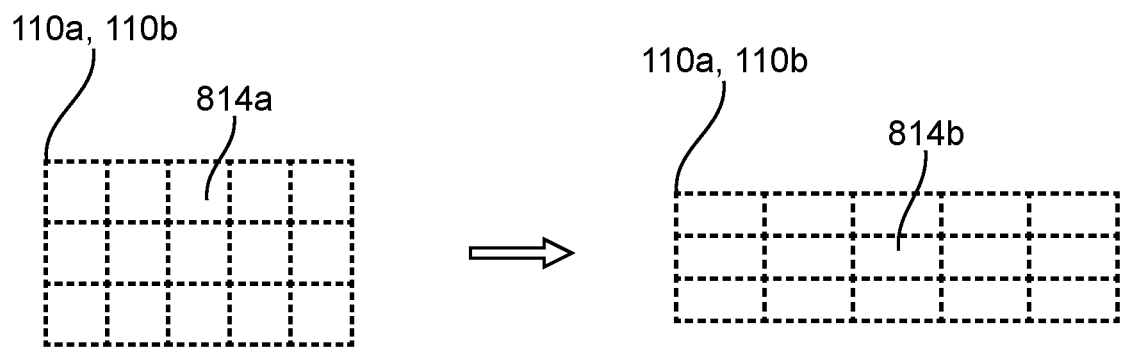
FIG. 10B is a schematic view of a second step of the laser peening process of FIG. 6A.
Figure 10C:
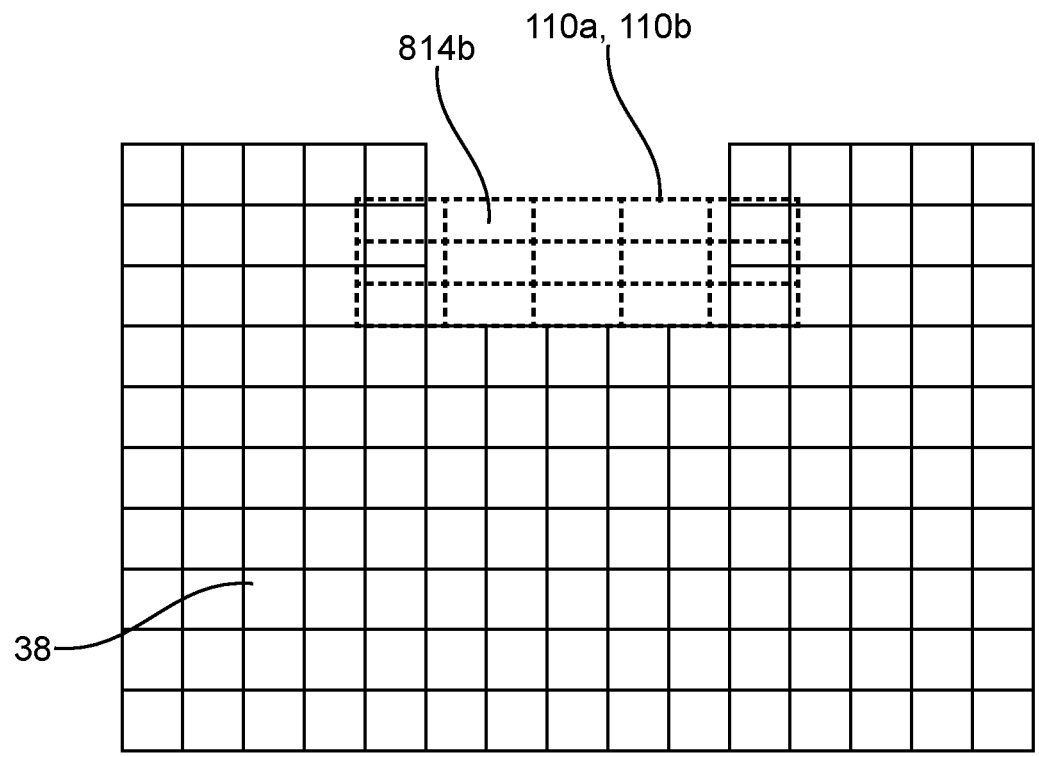
FIG. 10C is a schematic view of a third step of the laser peening process of FIG. 6A.
Figure 10D:
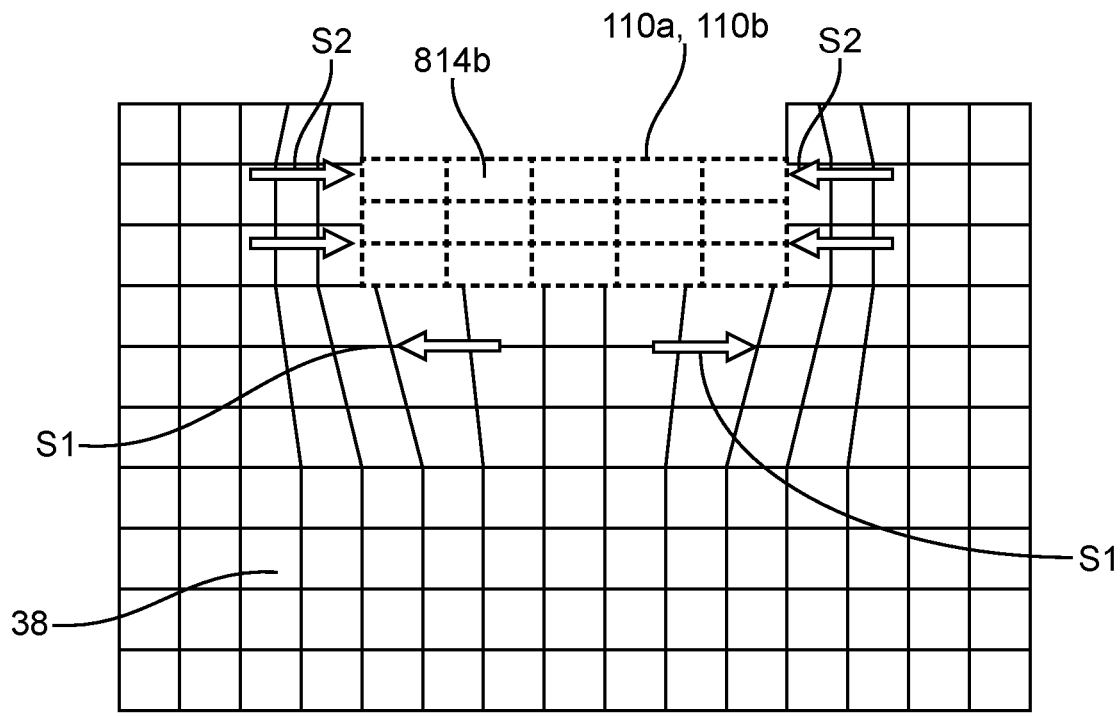
FIG. 10D is a schematic view of a fourth step of the laser peening process of FIG. 6A.

As illustrated in FIG. 10A, the laser peening process includes providing a laser pulse 806 at the target area 110a, 110b. The laser pulse 806 creates a plasma shock wave that applies pressure to the metal at the target area 110a, 110b, thereby introducing strain, shock, and/or dislocations into the microstructure of the anvil 38 at the target area 110a, 110b. Specifically, with reference to FIG. 10B, the plasma shock wave mechanically modifies the metal at the target area 110a, 110b from a first state 814a to a second state 814b. As illustrated in FIG. 10C, in the second state 814b, the target area 110a, 110b is pushed up against surrounding areas of the anvil 38 that were not targeted during the laser peening process. With reference to FIG. 10D, the surrounding areas then elastically recover to fit around the metal at the target area 110a, 110b. As a result, a tensile stress S1 develops in the surrounding areas of the anvil 38, while the surrounding areas of the anvil 38 also provide a compressive residual stress S2 on the target area 110a, 110b. The net force provided by these stresses S1, S2 help to reduce net internal stresses, thereby improving the lifespan of the anvil 38 by providing resistance to fatigue cracking and crack propagation.

As the laser peening process occurs, cooling fluid such as water may be run over the anvil 38, and more specifically, the target areas 110a, 110b. Introducing water to the laser peening process helps to maintain plasma in place for forming the compressive stress S2. Tape may also be applied to an outer surface of the anvil 38 as the laser peening process occurs. A layer of tape provides the anvil 38 with an opaque surface that amplifies the blast to aid in forming stress in the anvil 38.

The laser peening process (FIGS. 10A-10D) is advantageous over similar anvil 38 forming processes such as shot-peening or laser ablating because the laser pulse (FIG. 10A) can go deeper into the metal, can be provided for a longer duration at a higher power, and can target more exact areas (i.e., the target areas 110a-b). For example, the laser peening process may be able to produce compressive residual stress between 1 and 12 mm deep below a metal surface, whereas other processes may only be able to impact a surface of the anvil 38. The compressive residual stress S2 (FIG. 10D) counteracts stresses that may be applied to the anvil 38 during operation of the power tool 10 (FIG. 1). Additionally, the laser pulse is able to target specific spot sizes on the anvil 38 of roughly 1 mm. As such, the laser peening process enables a user or manufacturer to successfully create very fine areas of residual stress within and/or on the anvil 38, thereby improving wear resistance and the overall lifespan of the anvil 38 (FIG. 2).

Thus, to manufacture the anvil 38, a blank of material (e.g., medium carbon steel, tool steel, etc.) is processed via a metal shaping step, such as forging, casting, a PM manufacturing process, or the like, to form the overall shape of the anvil 38. The anvil 38 may then be machined to form the drive surfaces 94, transition surfaces 96, groove 103, and/or other features of the anvil 38. After machining, the anvil 38 may undergo a combination of hardening processes. For example, the anvil 38 may first undergo carburization to increase the carbon content of the anvil 38, thereby resulting in larger residual stresses from subsequent hardening processes. As such, if the anvil 38 is carburized, carburization must occur before the subsequent local surface hardening processes to obtain to benefits of an increased carbon content in the anvil. In the illustrated embodiment, the ideal carbon content for the anvil 38 may be 0.3% or greater.

Local surface hardening processes, such as a diffusive surface hardening process, a laser heating process, or an induction heat treatment process as described above, may then be performed after carburization to form the hardened layer 109 with a higher hardness relative to the remaining core 107 of the anvil 38 (FIG. 4). Specifically, with reference to FIG. 4, each of regions A, B, C, and D may undergo the local surface hardening process (e.g., induction hardening). By treating each of the regions A, B, C, and D, the induction hardening treatment process has a greater tolerance for imprecision to ensure that transitions between differently-shaped regions, where stresses may be the highest, are induction hardened.

After forming the hardened layer 109, the anvil 38 may undergo an additional process, such as laser peening, to form compressive residual stresses in the target areas 110a, 110b, 110c, 110d and/or other desired areas of the anvil 38 and, in some embodiments, a subsequent shot peening process. The resultant anvil 38 may combine high toughness and high wear resistance in appropriate areas to increase the lifespan of the anvil 38 and to allow the anvil 38 to transmit greater amounts of torque.

The processes described herein with respect to the anvil 38 may also be applied to other power tool components, such as the hammer 34 (e.g., the hammer 434 of FIG. 8 and/or the hammer 634 of FIG. 9A) and the camshaft 26. For example, the impact surfaces of the hammer lugs may be locally hardened and/or processed to add compressive residual stresses using the methods described herein to increase wear resistance and fatigue crack resistance in the hammer 34. In some embodiments, the camshaft 26 and the hammer 34 each include cam grooves that receive balls coupling the hammer 34 to the camshaft 26. In such embodiments, the grooves in the camshaft 26 and/or the hammer 34 may be locally hardened using the methods described herein for increased wear resistance. In yet other embodiments, other power tool components with complex geometries and thin features that may otherwise be susceptible to through-hardening and resultant brittleness when subjected to conventional hardening or treatment processes may be manufactured according to the methods described herein.

Figure 11:
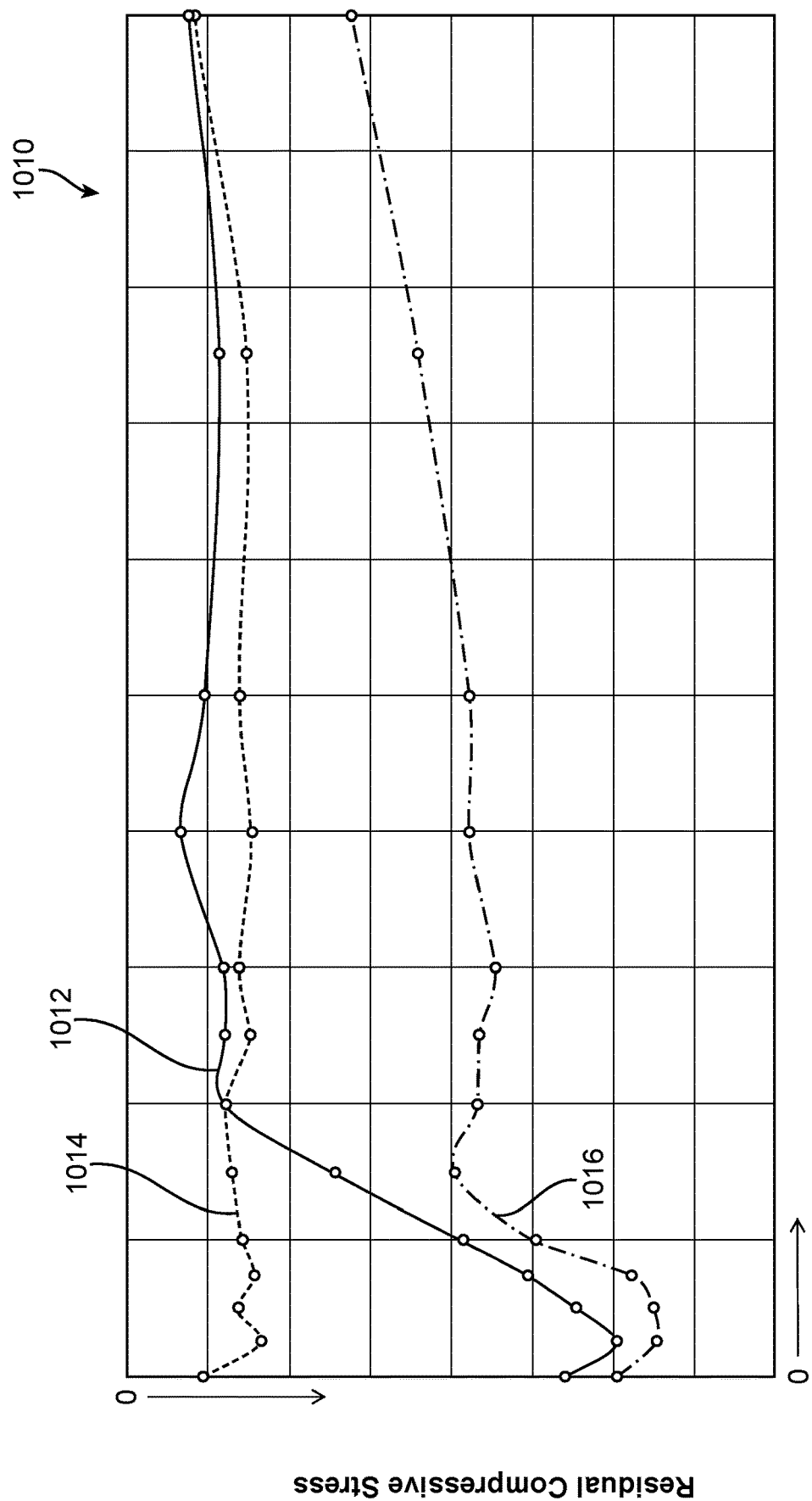
FIG. 11 is a first graph plotting data for anvils that have undergone different variations of treatment processes.
Figure 12:
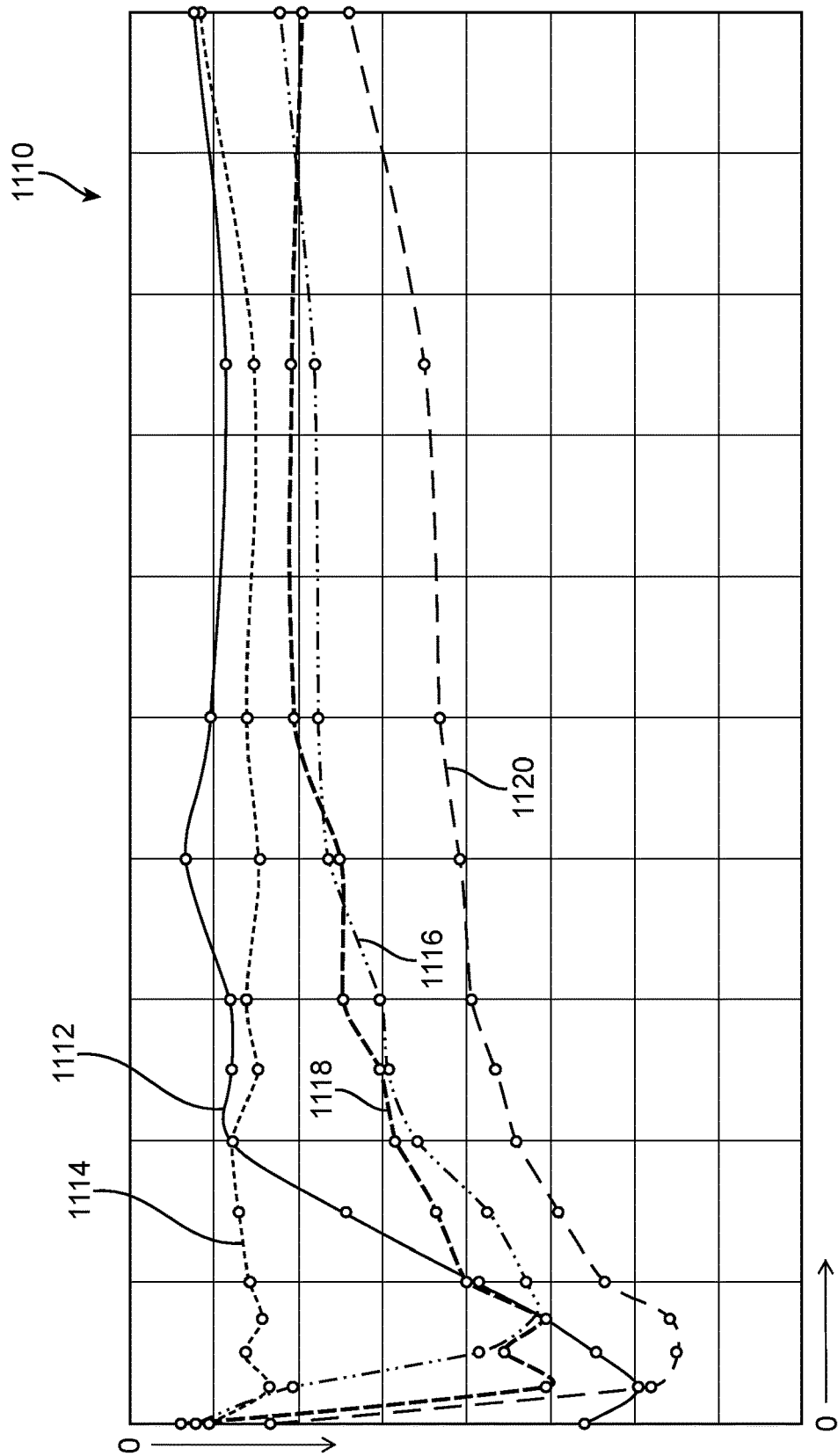
FIG. 12 is a second graph plotting data for the anvils that have undergone different variations of treatment processes.
Figure 13:
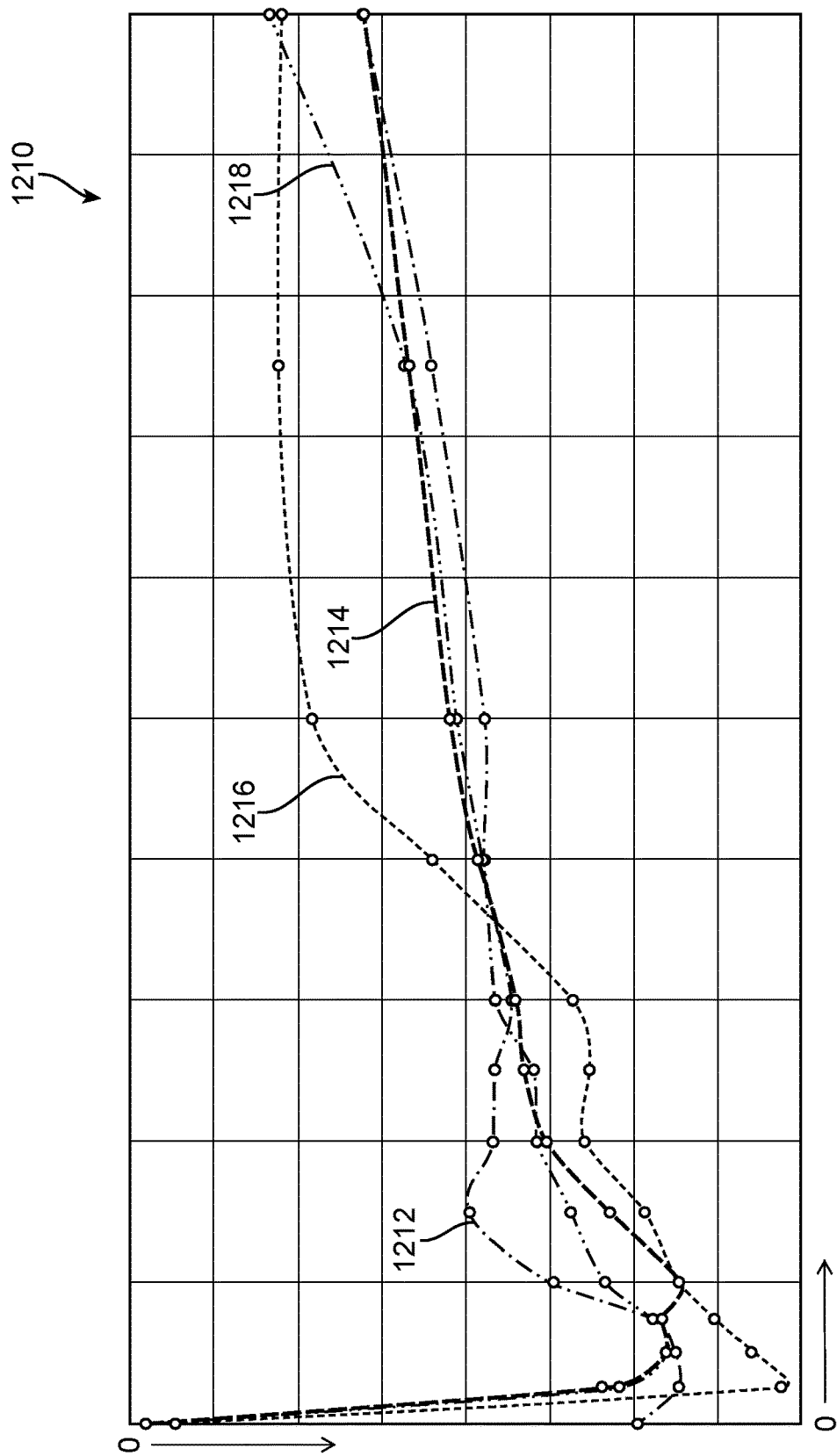
FIG. 13 is a third graph plotting data for the anvils that have undergone different variations of treatment processes.

FIGS. 11-13 illustrates graphs 1010, 1110, 1210 including plots of data for anvils that have undergone various hardening treatment processes. Specifically, each of the graphs 1010, 1110, 1210 plots the residual compressive stress for an anvil relative to depth from the outer surface of the anvil.

FIG. 11 illustrates a first graph 1010. The first graph 1010 includes a first line 1012, a second line 1014, and a third line 1016. The first line 1012 illustrates the stress-depth relationship for an anvil that has undergone shot peening. The second line 1014 illustrates the stress-depth relationship for an anvil that has not undergone shot peening. The third line 1016 illustrates the stress-depth relationship for an anvil that has undergone shot peening and induction heat treatment. As illustrated in FIG. 11, an anvil that has undergone shot peening and induction heat treatment, as illustrated by the third line 1016, has a higher maximum residual compressive stress and a higher residual compressive stress at the surface than an anvil that has undergone shot peening, as illustrated by the first line 1012, and an anvil that has not undergone shot peening, as illustrated by the second line 1014. Therefore, the first graph 1010 illustrates that shot peening and induction heat treating an anvil, in combination, may advantageously increase the compressive residual stresses for an anvil.

FIG. 12 illustrates a second graph 1110. The second graph 1110 includes a first line 1112, a second line 1114, a third line 1116, a fourth line 1118, and a fifth line 1120. The first line 1112 illustrates the stress-depth relationship for an anvil that has undergone carburization and shot peening. The second line 1114 illustrates the stress-depth relationship for a carburized anvil that has not undergone shot peening. The third line 1116 illustrates the stress-depth relationship for a carburized anvil that has not undergone shot peening and has received laser peening at the third area 110c of the anvil, as illustrated in FIG. 5C. The fourth line 1118 illustrates the stress-depth relationship for a carburized anvil that has not undergone shot peening and has received laser peening in the second area 110b of the anvil, as illustrated in FIG. 5B. The fifth line 1120 illustrates the stress-depth relationship for a carburized anvil that has not undergone shot peening and has received laser peening in the fourth area 110d of the anvil, as illustrated in FIG. 5D.

With continued reference to FIG. 12, the anvil that has undergone shot peening, as illustrated by the first line 1112, has a much greater residual compressive stress than each of the anvils with no shot peening (i.e., the second line 1114, the third line 1116, the fourth line 1118, and the fifth line 1120) at the surface of the anvil. As such, the second graph 1110 illustrates the benefits of shot peening if high compressive residual stress is desired at the surface of the anvil. The second graph 1110 also illustrates the benefits of laser peening, regardless of where laser peening occurs, if higher compressive residual stresses are desired beneath the surface of the anvil. Specifically, the third line 1116, the fourth line 1118, and the fifth line 1120, which represent anvils that have undergone laser peening, each have higher compressive residual stresses at a depth of roughly 0.1 mm or greater from the surface than the anvils represented by the first line 1112 and the second line 1114, which have not undergone laser peening.

FIG. 13 illustrates a third graph 1210. The third graph 1210 incudes a first line 1212, a second line 1214, a third line 1216, and a fourth line 1218. The first line 1212 illustrates the stress-depth relationship for an anvil that has undergone shot peening and induction heat treatment. The second line 1214 illustrates the stress-depth relationship for an anvil that has undergone shot peening and induction heat treatment and received laser peening at the third area 110c of the anvil, as illustrated in FIG. 5C. The third line 1216 illustrates the stress-depth relationship for an anvil that has undergone shot peening and induction heat treatment and received laser peening at the fourth area 110d of the anvil, as illustrated in FIG. 5D. The fourth line 1218 illustrates the stress-depth relationship for an anvil that has undergone shot peening and induction heat treatment and received laser peening at the second area 110b of the anvil, as illustrated in FIG. 5B.

The third graph 1210 illustrates the benefits of laser peening at the various target areas 110b, 110c, 110d. Specifically, as illustrated by the third line 1216, laser peening at the fourth area 110d (FIG. 5D) may result in an anvil that has relatively high compressive residual stresses between the surface and roughly 0.35 mm from the surface of the anvil. However, at depths greater than 0.35 mm, the anvil represented by the third line 1216 begins to have relatively lower compressive residual stresses. As such, different combinations of localized heat treatment processes and target areas for laser peening may desirable across different circumstances. That is, the most optimal combination of hardening processes may be determined according to the depth at which the highest stresses occur for any given working operation. Furthermore, including a shot peening process after a laser peening process can advantageously provide high compressive residual stresses both at and below the treated surface of the anvil.

Although the disclosure has been described in detail with reference to certain preferred embodiments, variations and modifications exist within the scope and spirit of one or more independent aspects of the disclosure as described.

Various features and aspects of the present disclosure are set forth in the following claims.

What is claimed is:

1. An anvil for an impact tool, the anvil comprising:
an impact receiving portion at an end of the anvil, the impact receiving portion including a lug having an impact receiving surface that receives impact from a hammer of the impact tool;
a shank portion extending from the impact receiving portion;
a drive portion located at an end of the shank portion opposite from the impact receiving portion, the drive portion including a plurality of drive surfaces configured to engage a tool bit; and
a hardened layer formed on at least one of the drive portion or the impact receiving surface, the hardened layer having a higher hardness than a remaining portion of the anvil,
wherein the hardened layer is formed by a heating process.

2. The anvil of claim 1, wherein compressive residual stresses are added to the hardened layer by a peening process.

3. The anvil of claim 2, wherein the peening process is a laser peening process.

4. The anvil of claim 2, wherein the compressive residual stresses are added to the hardened layer at a location that is beneath a surface of the anvil.

5. The anvil of claim 2, wherein the hardened layer is formed by the heating process over an entirety of the drive portion, and wherein the compressive residual stresses are added, via the peening process, at only a portion of the drive portion.

6. The anvil of claim 5, wherein the compressive residual stresses are added to at least a quarter of an area of each of the drive surfaces.

7. The anvil of claim 1, wherein the hardened layer is formed on both the drive portion and the impact receiving surface.

8. The anvil of claim 1, wherein the hardened layer does not extend along the shank portion.

9. An anvil for an impact tool, the anvil comprising:
an impact receiving portion at an end of the anvil, the impact receiving portion including a lug having an impact receiving surface that receives impact from a hammer of the impact tool;
a shank portion extending from the impact receiving portion; and
a drive portion located at an end of the shank portion opposite from the impact receiving portion, the drive portion including a plurality of drive surfaces configured to engage a tool bit,
wherein at least one of the impact receiving portion or the drive portion includes a region having compressive residual stresses; and
wherein the compressive residual stresses are imparted to the region by a laser peening process.

10. The anvil of claim 9, wherein the region having compressive residual stresses is beneath a surface of the anvil.

11. The anvil of claim 9, wherein the region is treated with a heating process to create a hardened layer in addition to the compressive residual stresses.

12. The anvil of claim 11, wherein the drive portion includes the region, and wherein the hardened layer extends along an entire length of the drive portion.

13. The anvil of claim 9, wherein the drive portion includes the region, and wherein the region includes corners of each of the plurality of drive surfaces that are positioned closest to the shank.

14. The anvil of claim 13, wherein the region includes more than a quarter of an entire area of each of the plurality of drive surfaces.

15. The anvil of claim 14, wherein the region includes the entire area of each of the plurality of drive surfaces.

16. The anvil of claim 9, wherein the compressive residual stresses are imparted to the region by a shot peening process following the laser peening process.

17. An anvil for an impact tool, the anvil comprising:
an impact receiving portion at an end of the anvil, the impact receiving portion including a lug having an impact receiving surface that receives impact from a hammer of the impact tool;
a shank portion extending from the impact receiving portion;
a drive portion located at an end of the shank portion opposite from the impact receiving portion, the drive portion including a plurality of drive surfaces configured to engage a tool bit; and
a hardened layer formed on at least one of the drive portion or the impact receiving surface, the hardened layer having a higher hardness than a remaining portion of the anvil,
wherein the hardened layer is formed by a diffusion process.

18. The anvil of claim 17, wherein the diffusion process includes carburization.

19. The anvil of claim 17, wherein compressive residual stresses are added to the hardened layer by a peening process.

20. The anvil of claim 19, wherein the peening process includes a laser peening process and a subsequent shot peening process.

* * * * *